United States Patent
Biskeborn et al.

(10) Patent No.: US 11,232,815 B2
(45) Date of Patent: *Jan. 25, 2022

(54) MULTI-SPOOL TAPE RECORDING APPARATUS HAVING REMOVABLE MOUNTS FOR SUPPORTING TAPE SPOOL PAIRS

(71) Applicant: International Business Machines Corporation, Armonk, NY (US)

(72) Inventors: Robert Biskeborn, Hollister, CA (US); Hoodin Hamidi, San Francisco, CA (US); Edwin Ralph Childers, Tucson, AZ (US); Donald Charles Acosta, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,741

(22) Filed: Oct. 29, 2019

(65) Prior Publication Data

US 2021/0125637 A1     Apr. 29, 2021

(51) Int. Cl.
| | | |
|---|---|---|
| *G11B 23/087* | (2006.01) | |
| *G11B 23/037* | (2006.01) | |
| *G11B 23/18* | (2006.01) | |

(52) U.S. Cl.
CPC ...... *G11B 23/037* (2013.01); *G11B 23/08757* (2013.01); *G11B 23/18* (2013.01); *G11B 2220/90* (2013.01)

(58) Field of Classification Search
None
See application file for complete search history.

(56) References Cited

U.S. PATENT DOCUMENTS 2,821,576 A * 1/1958 Gaubert ............. G11B 15/6895
                                                   360/92.1
3,140,360 A * 7/1964 Whitworth ........... G11B 15/684
                                                   360/92.1
(Continued)

FOREIGN PATENT DOCUMENTS

FR   2674059 A1 *  9/1992  ....... G11B 23/08778
GB    733807 A  *  7/1955  ............. G11B 15/58
(Continued)

OTHER PUBLICATIONS

Dorrell et al., "Mass Storage Device," IP.com Prior Art Database, Technical Disclosure No. IPCOM000078721D, Feb. 1, 1973, Published online Feb. 26, 2005, pp. 1-3.
(Continued)

*Primary Examiner* — William J Klimowicz
(74) *Attorney, Agent, or Firm* — Zilka-Kotab, P.C.

(57) ABSTRACT

An apparatus, in accordance with one approach, includes a receiving area configured to receive a plurality of mounts, each mount being configured to support at least one tape spool pair thereon. A magnetic head is configured to perform data operations on magnetic recording tapes of the tape spool pairs. A positioning mechanism is configured to selectively align the magnetic head to a selected one of the tape spool pairs. A product apparatus, in accordance with another approach, includes a mount having a tape spool pair thereon. The mount is configured to be inserted in a receiving area of an apparatus configured to receive a plurality of mounts.

25 Claims, 24 Drawing Sheets

(56) References Cited

U.S. PATENT DOCUMENTS

| | | | | |
|---|---|---|---|---|
| 3,280,947 | A * | 10/1966 | Brewster | F16D 13/02 |
| | | | | 192/26 |
| 3,511,940 | A * | 5/1970 | Lemelson | G11B 15/683 |
| | | | | 360/92.1 |
| 3,534,178 | A * | 10/1970 | Weigel | G11B 5/00 |
| | | | | 360/92.1 |
| 3,724,774 | A | 4/1973 | Hamilton-Fey | |
| 3,733,078 | A * | 5/1973 | Staar | G11B 15/684 |
| | | | | 360/78.03 |
| 3,752,483 | A * | 8/1973 | Olliges | G11B 15/6815 |
| | | | | 360/71 |
| 3,756,487 | A | 9/1973 | Pechi | |
| 3,758,730 | A * | 9/1973 | Rothschild | G11B 15/1883 |
| | | | | 242/337 |
| 3,809,827 | A * | 5/1974 | Oyaba | G11B 15/684 |
| | | | | 360/251 |
| 3,819,130 | A * | 6/1974 | Moxness | G11B 23/04 |
| | | | | 242/337.1 |
| 3,881,053 | A * | 4/1975 | Lemelson | G11B 27/002 |
| | | | | 348/107 |
| 3,935,595 | A * | 1/1976 | Kondo | G11B 15/684 |
| | | | | 360/92.1 |
| 4,020,506 | A * | 4/1977 | Barrett | G11B 5/55 |
| | | | | 360/137 |
| 4,319,291 | A * | 3/1982 | Drubeck | G11B 5/00817 |
| | | | | 360/74.1 |
| 4,797,759 | A * | 1/1989 | Koizumi | G11B 15/442 |
| | | | | 360/92.1 |
| 4,879,613 | A | 11/1989 | Koizumi et al. | |
| 4,918,548 | A | 4/1990 | O'Donnell et al. | |
| 5,979,814 | A | 11/1999 | Childers | |
| 6,115,206 | A | 9/2000 | Leggett | |
| 6,239,942 | B1 | 5/2001 | Leggett | |
| 8,494,674 | B2 * | 7/2013 | McClelland | G11B 15/66 |
| | | | | 700/218 |
| 8,509,946 | B2 * | 8/2013 | McClelland | G11B 15/66 |
| | | | | 700/218 |
| 9,418,696 | B2 * | 8/2016 | McClelland | G11B 15/66 |
| 9,640,209 | B1 * | 5/2017 | Bui | G11B 20/1816 |
| 11,043,237 | B2 | 6/2021 | Biskeborn et al. | |
| 2003/0142437 | A1 * | 7/2003 | Rudi | G11B 25/063 |
| | | | | 360/96.1 |
| 2004/0228034 | A1 | 11/2004 | Nakao et al. | |
| 2011/0182157 | A1 | 7/2011 | Hoerger | |
| 2015/0003951 | A1 * | 1/2015 | Best | G11B 33/06 |
| | | | | 414/749.1 |
| 2021/0134323 | A1 | 5/2021 | Biskeborn et al. | |
| 2021/0134324 | A1 | 5/2021 | Biskeborn et al. | |

FOREIGN PATENT DOCUMENTS

| | | | | |
|---|---|---|---|---|
| GB | 1121421 A | * | 7/1968 | G11B 15/681 |
| JP | 58155560 A | * | 9/1983 | G11B 15/32 |
| JP | 60133560 A | * | 7/1985 | |
| JP | 2003157646 A | * | 5/2003 | |
| JP | 2013122803 A | * | 6/2013 | G11B 15/62 |

OTHER PUBLICATIONS

Biskeborn et al., U.S. Appl. No. 16/672,124, filed Nov. 1, 2019.
Restriction Requirement from U.S. Appl. No. 16/672,124, dated Apr. 13, 2020.
Non-Final Office Action from U.S. Appl. No. 16/672,124, dated Jul. 14, 2020.
Biskeborn et al., U.S. Appl. No. 17/129,600, filed Dec. 21, 2020.
Final Office Action from U.S. Appl. No. 16/672,124, dated Dec. 4, 2020.
Notice of Allowance from U.S. Appl. No. 16/672,124, dated Jan. 28, 2021.
Notice of Allowance from U.S. Appl. No. 16/672,124, dated Feb. 18, 2021.
Supplemental Notice of Allowance from U.S. Appl. No. 16/672,124, dated Mar. 17, 2021.
Supplemental Notice of Allowance from U.S. Appl. No. 16/672,124, dated Apr. 9, 2021.
Supplemental Notice of Allowance from U.S. Appl. No. 16/672,124, dated May 19, 2021.
International Search Report and Written Opinion from PCT Application No. PCT/IB2020/059850, dated Jun. 24, 2021.

* cited by examiner

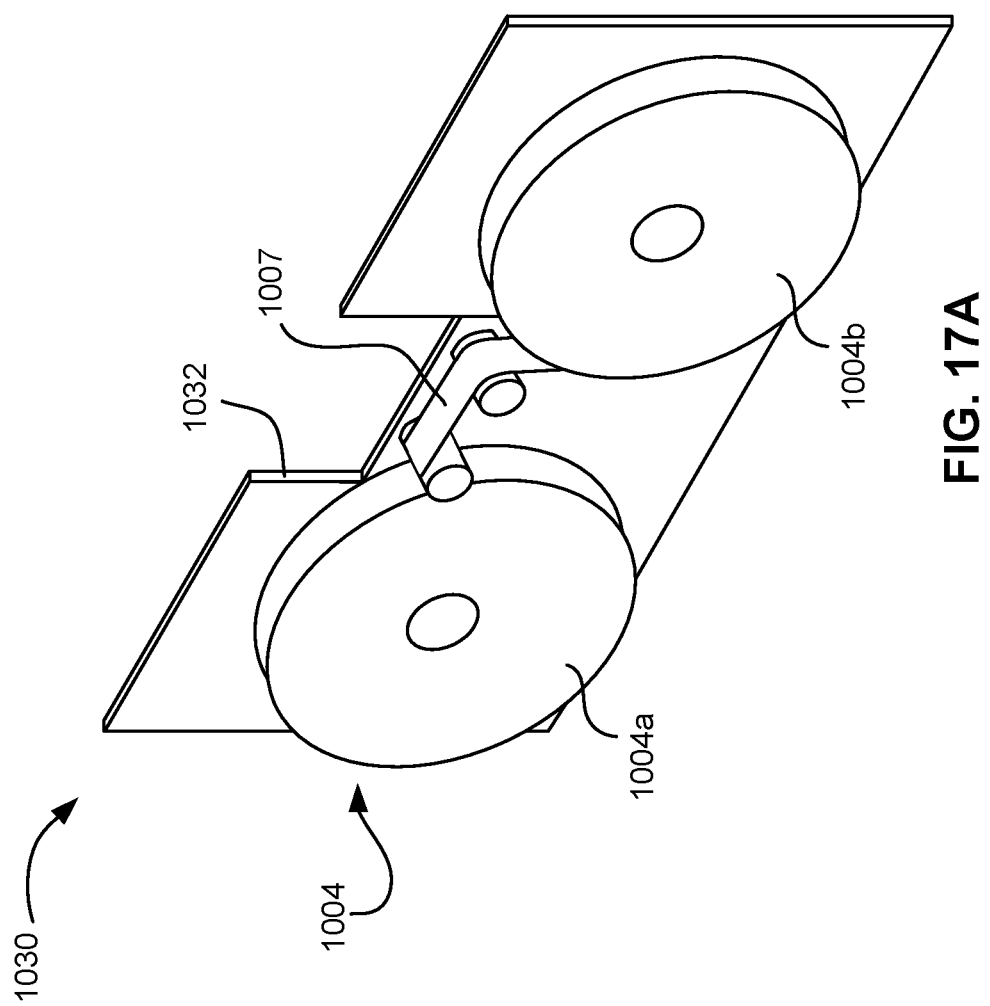

MULTI-SPOOL TAPE RECORDING APPARATUS HAVING REMOVABLE MOUNTS FOR SUPPORTING TAPE SPOOL PAIRS

BACKGROUND

The present invention relates to data storage systems, and more particularly, this invention relates to an apparatus using multiple spools of magnetic tape to dramatically improve data access times.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage. One historical disadvantage of tape-based storage with respect to disk-based storage was the relatively poor access time associated with tape-based storage, with the time required to bring the tape to the tape drive and then spool the tape to the file location typically averaging about 40 seconds.

SUMMARY

An apparatus, in accordance with one approach, includes a receiving area configured to receive a plurality of mounts, each mount being configured to support at least one tape spool pair thereon. A magnetic head is configured to perform data operations on magnetic recording tapes of the tape spool pairs. A positioning mechanism is configured to selectively align the magnetic head to a selected one of the tape spool pairs.

The foregoing apparatus is capable of serving requests for data on tape in a fraction of the time typically required for cartridge-based tape library systems, while remaining economically viable. The speed is achieved in part by operating on an array of tape spool pairs each having a magnetic recording tape thereon. Because the spools are not in cartridges, but rather remain present in the apparatus, the typical cartridge loading time is eliminated. Moreover, because a single head can service a plurality of the tape spool pairs, and preferably all of the tape spool pairs, the deployment cost remains far below disk-based storage and solid-state storage on a cost per unit storage basis.

The mounts may or may not be present in the receiving area, according to various approaches. An additional benefit of some aspects of the apparatus is that the mounts can be removed for repair, replacement, and/or archiving.

A method, in accordance with one approach, includes instructing a positioning mechanism to selectively align a magnetic head to a selected tape spool pair of a plurality of tape spool pairs in a receiving area of an apparatus, each tape spool pair being on a removable mount that is selectively insertable in a receiving area of an apparatus having the positioning mechanism. An engagement mechanism is instructed to create a relative movement between the magnetic head and a magnetic recording tape of the selected tape spool pair for engaging the magnetic recording tape with the magnetic head. A drive mechanism is instructed to drive the selected tape spool pair. A magnetic head is caused to perform data operations on the magnetic recording tape of the selected tape spool pair.

The foregoing method generally provides similar benefits as described above for the apparatus.

A computer program product for performing data operations on magnetic recording tape, in accordance with one approach, includes a computer readable storage medium having program instructions embodied therewith, the program instructions executable by an apparatus to cause the apparatus to perform the foregoing method.

A product, in accordance with another approach, includes a mount having a tape spool pair thereon. The mount is configured to be inserted in a receiving area of an apparatus configured to receive a plurality of mounts. The portability of the mounts enables them to be removed for repair, replacement, and/or archiving, while enabling the apparatus to provide the benefits listed herein.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 17A is a representational view of a removable mount of FIG. 16 in accordance with one approach.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred approaches of magnetic storage systems, as well as operation and/or component parts thereof.

In one general approach, an apparatus includes a receiving area configured to receive a plurality of mounts, each mount being configured to support at least one tape spool pair thereon. A magnetic head is configured to perform data operations on magnetic recording tapes of the tape spool pairs. A positioning mechanism is configured to selectively align the magnetic head to a selected one of the tape spool pairs.

In one general approach, a method includes instructing a positioning mechanism to selectively align a magnetic head to a selected tape spool pair of a plurality of tape spool pairs in a receiving area of an apparatus, each tape spool pair being on a removable mount that is selectively insertable in a receiving area of an apparatus having the positioning mechanism. An engagement mechanism is instructed to create a relative movement between the magnetic head and a magnetic recording tape of the selected tape spool pair for engaging the magnetic recording tape with the magnetic head. A drive mechanism is instructed to drive the selected tape spool pair. A magnetic head is caused to perform data operations on the magnetic recording tape of the selected tape spool pair.

In one general approach, a computer program product for performing data operations on magnetic recording tape includes a computer readable storage medium having program instructions embodied therewith, the program instructions executable by an apparatus to cause the apparatus to perform the foregoing method.

In one general approach, a product includes a mount having a tape spool pair thereon. The mount is configured to be inserted in a receiving area of an apparatus configured to receive a plurality of mounts.

Figure 1A:
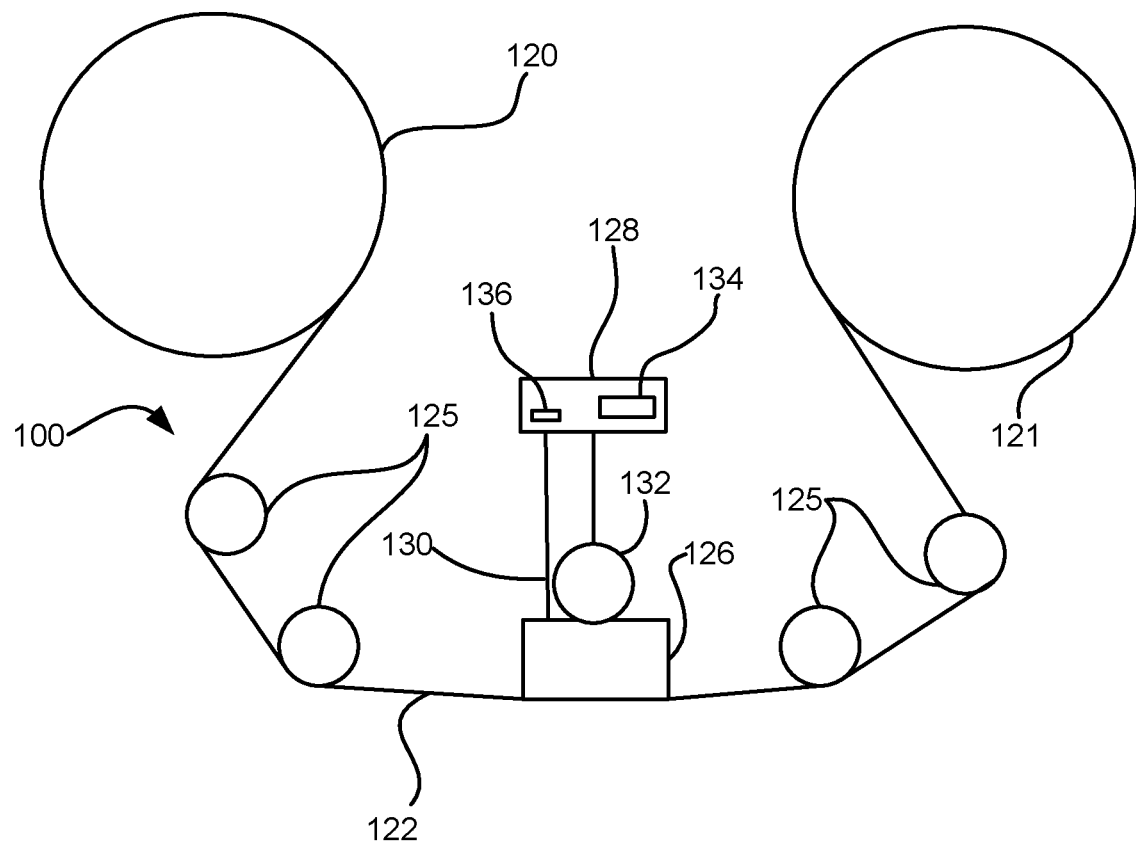
FIG. 1A is a schematic diagram of a simplified tape drive system according to one approach.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
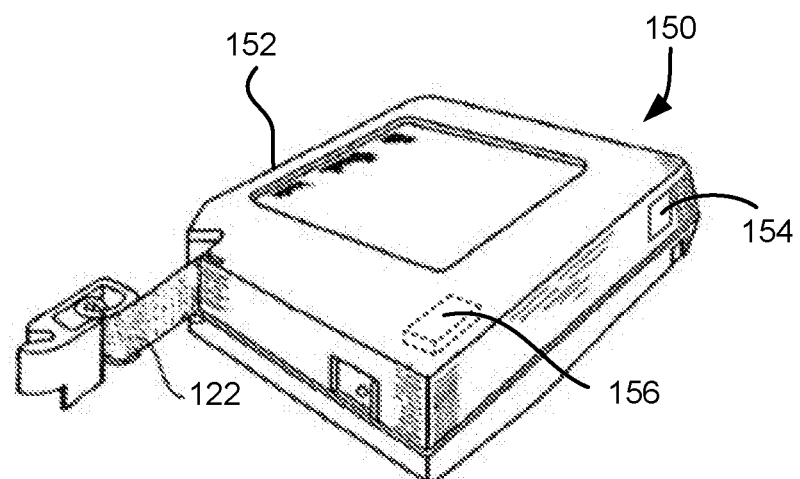
FIG. 1B is a schematic diagram of a tape cartridge according to one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
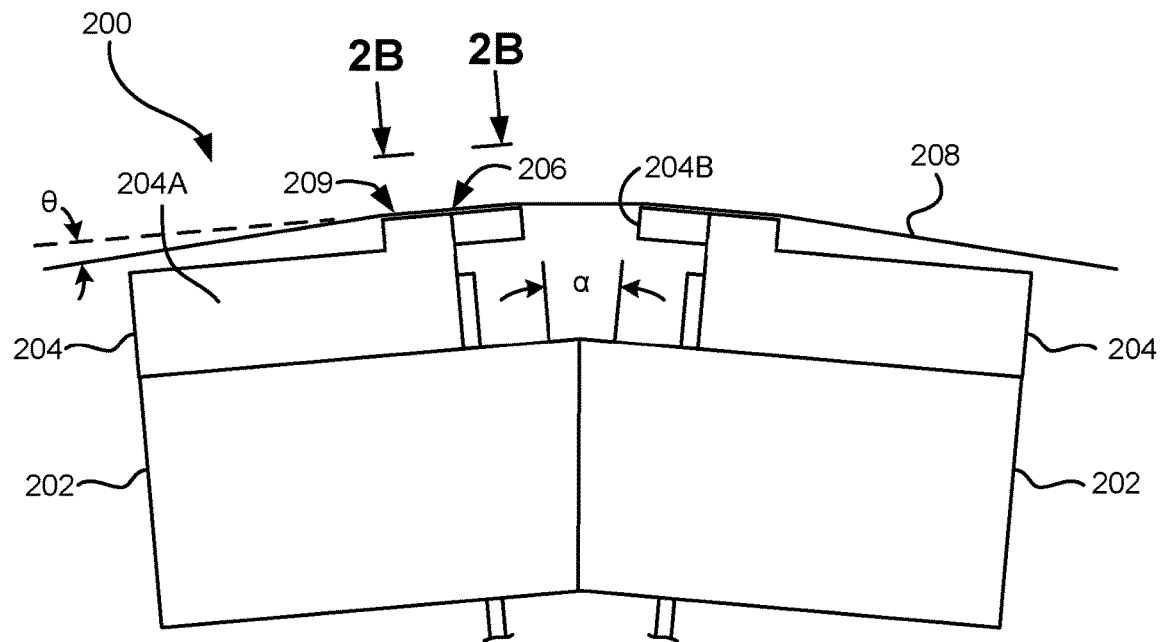
FIG. 2A illustrates a side view of a flat-lapped, bi-directional, two-module magnetic tape head according to one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
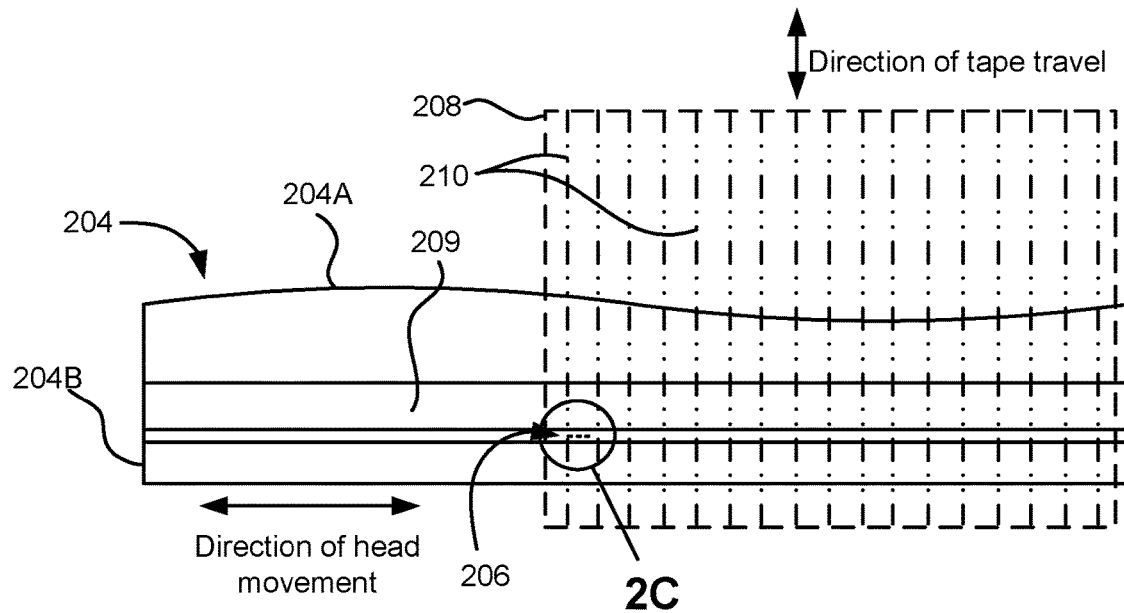
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
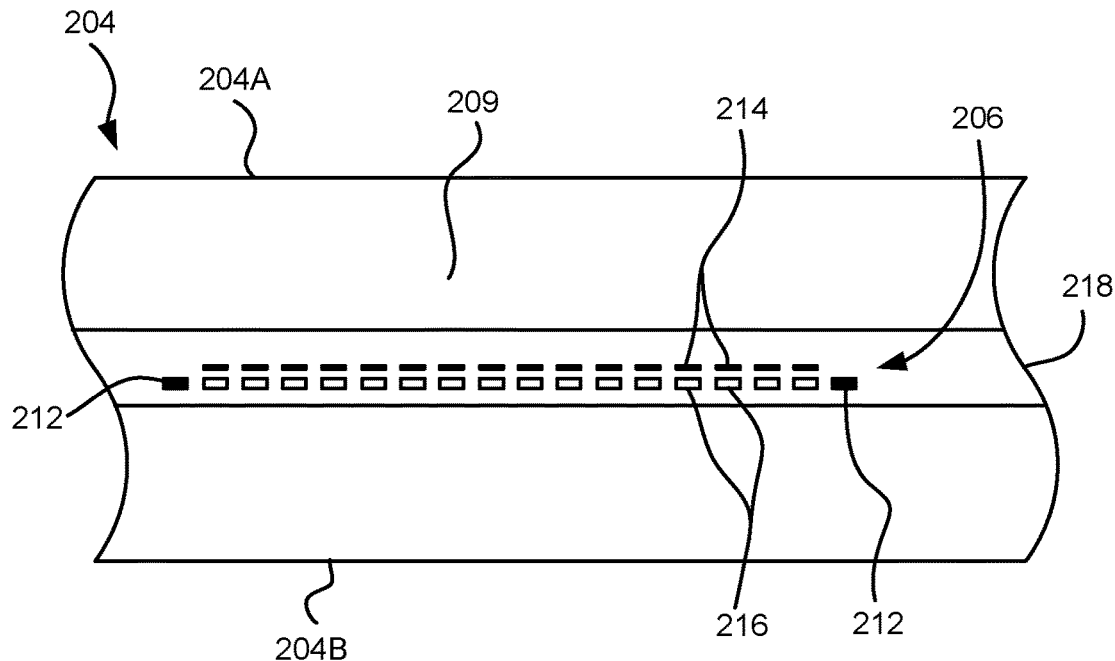
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
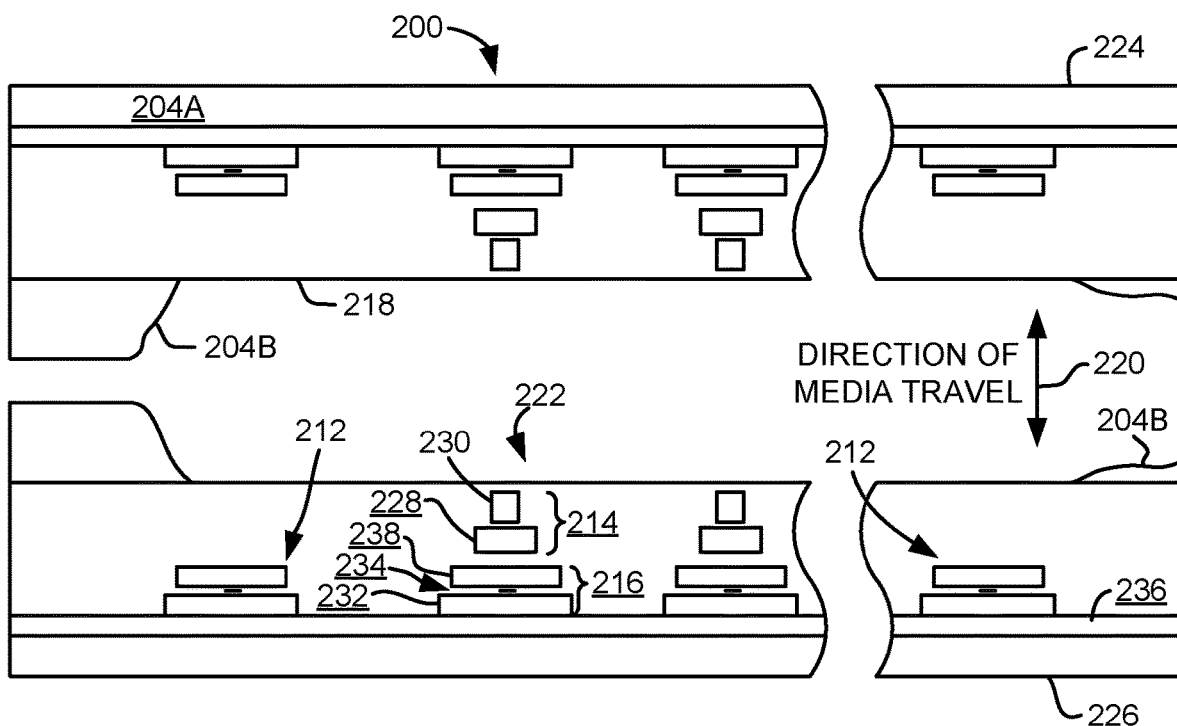
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
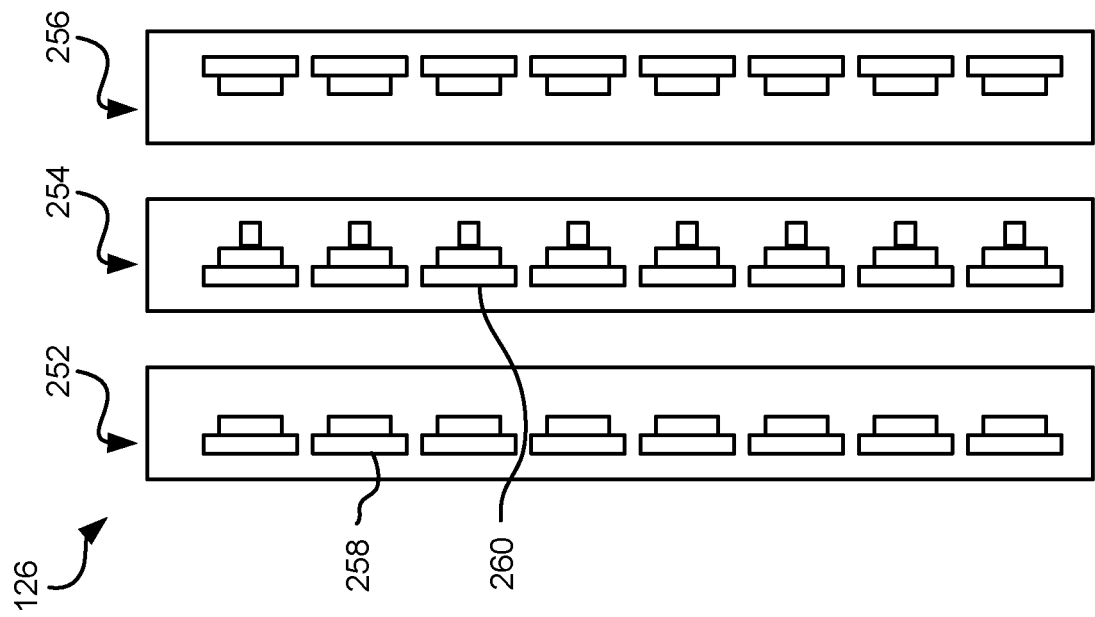
FIG. 4 is a partial tape bearing surface view of a magnetic head having a read-write-read configuration.
Figure 3:
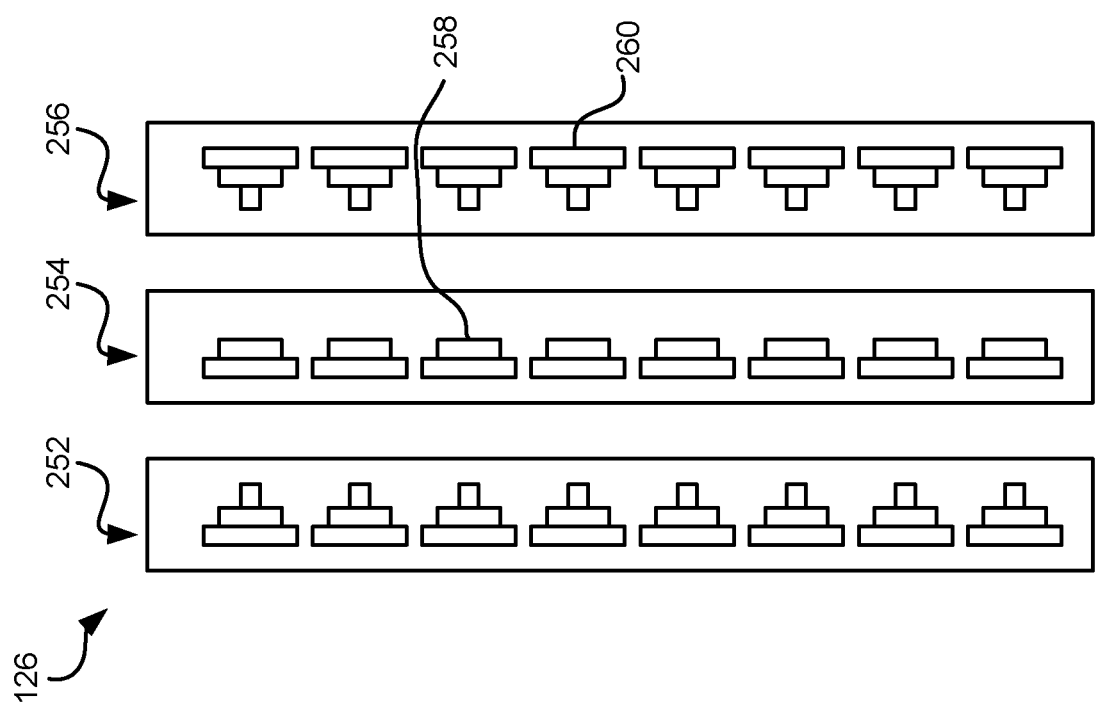
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
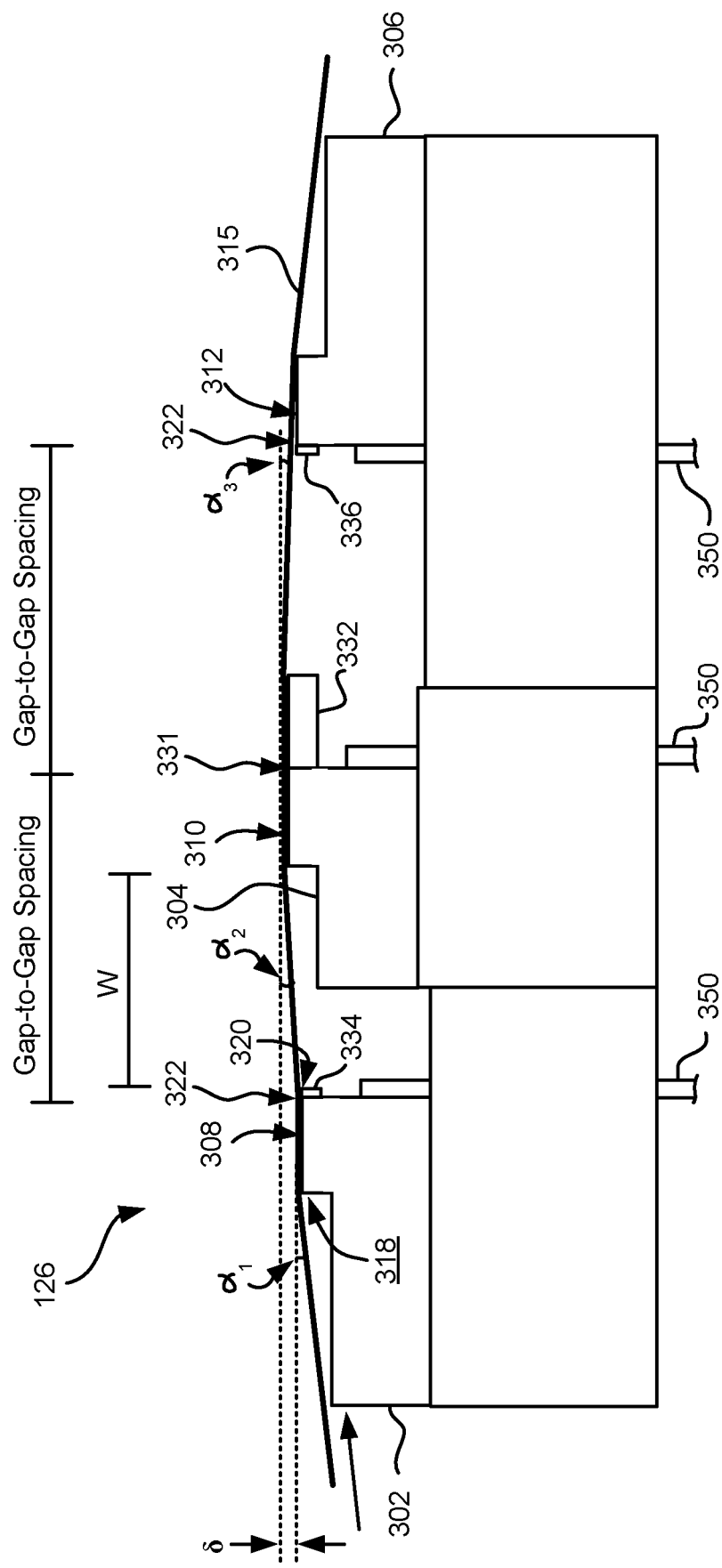
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
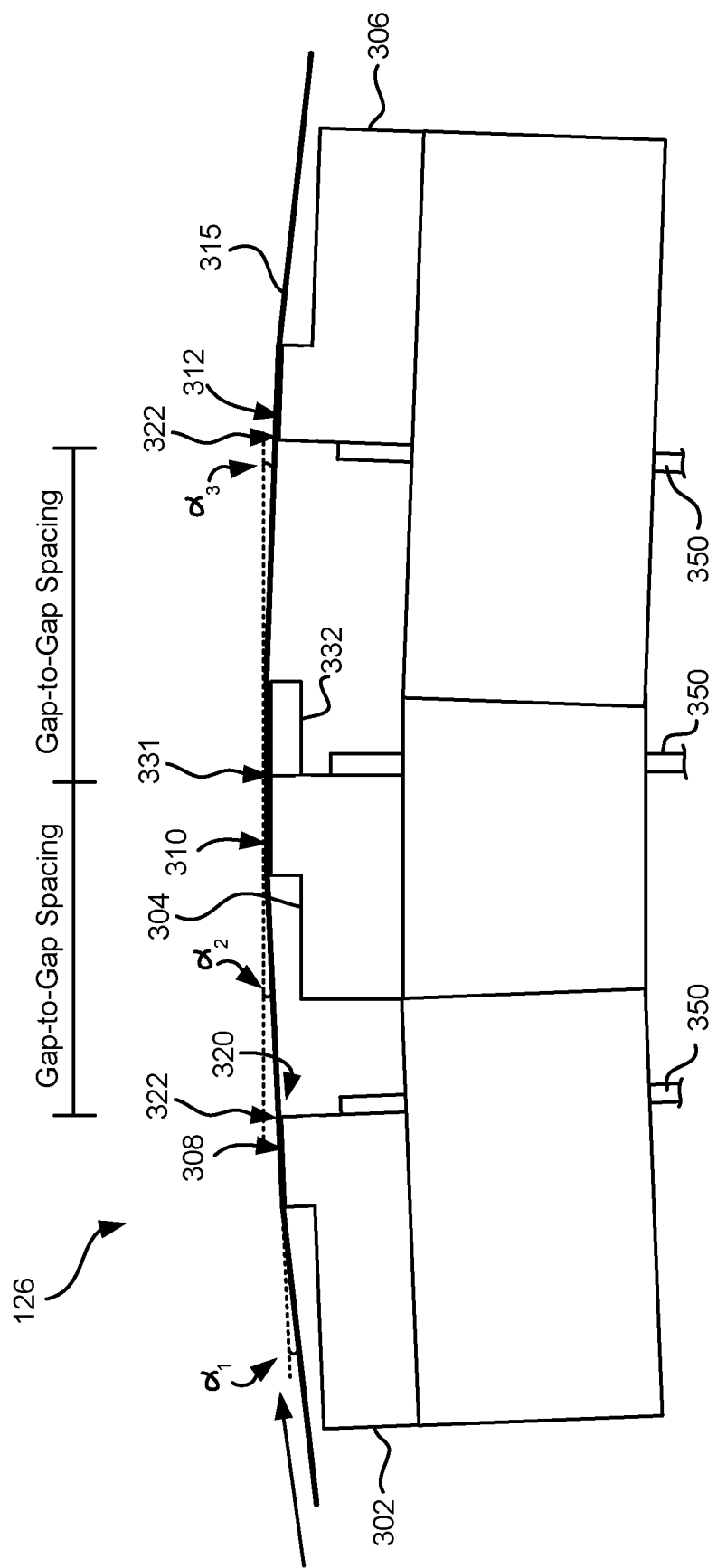
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
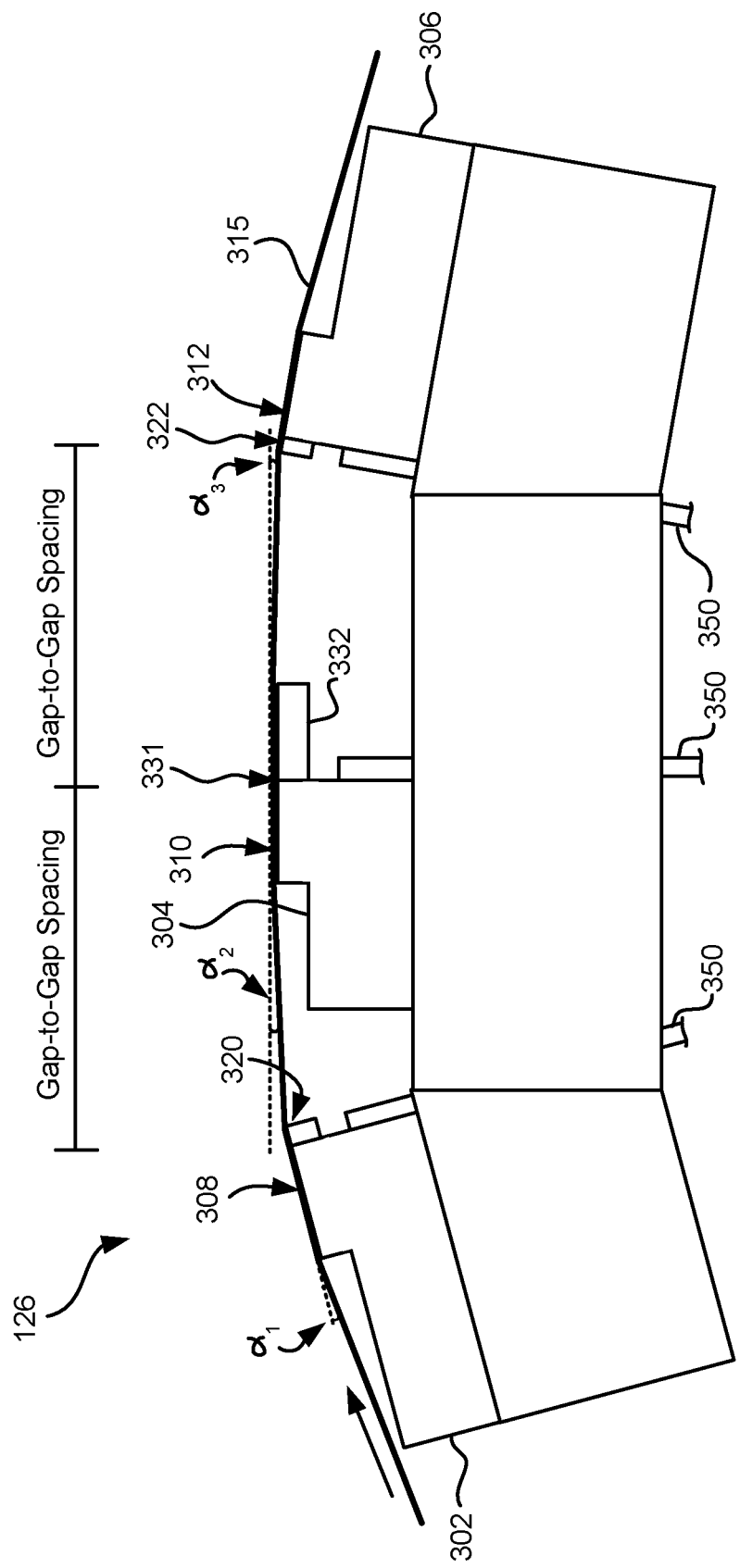
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
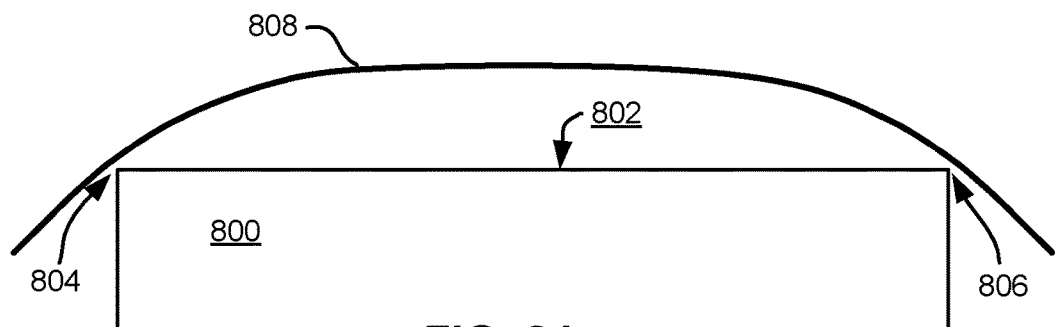
FIGS. 8A-8C are schematics depicting the principles of tape tenting.
Figure 8B:
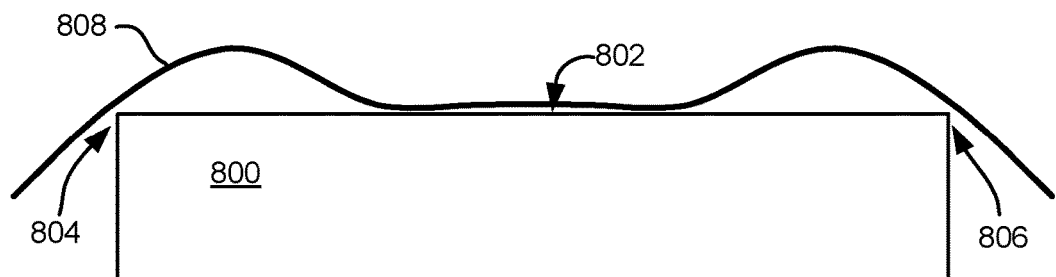
Figure 8C:
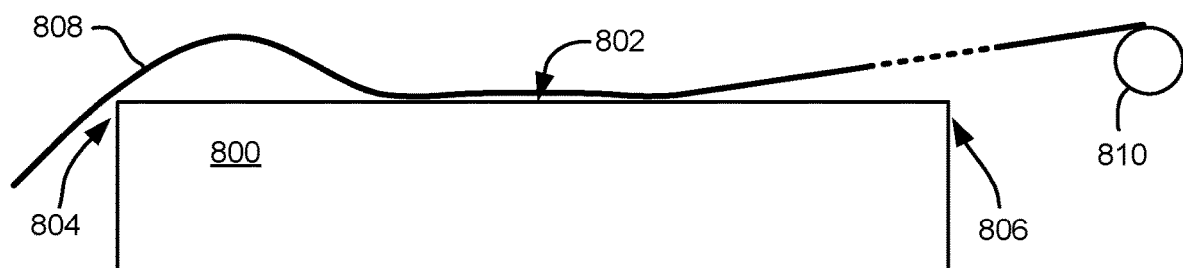

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
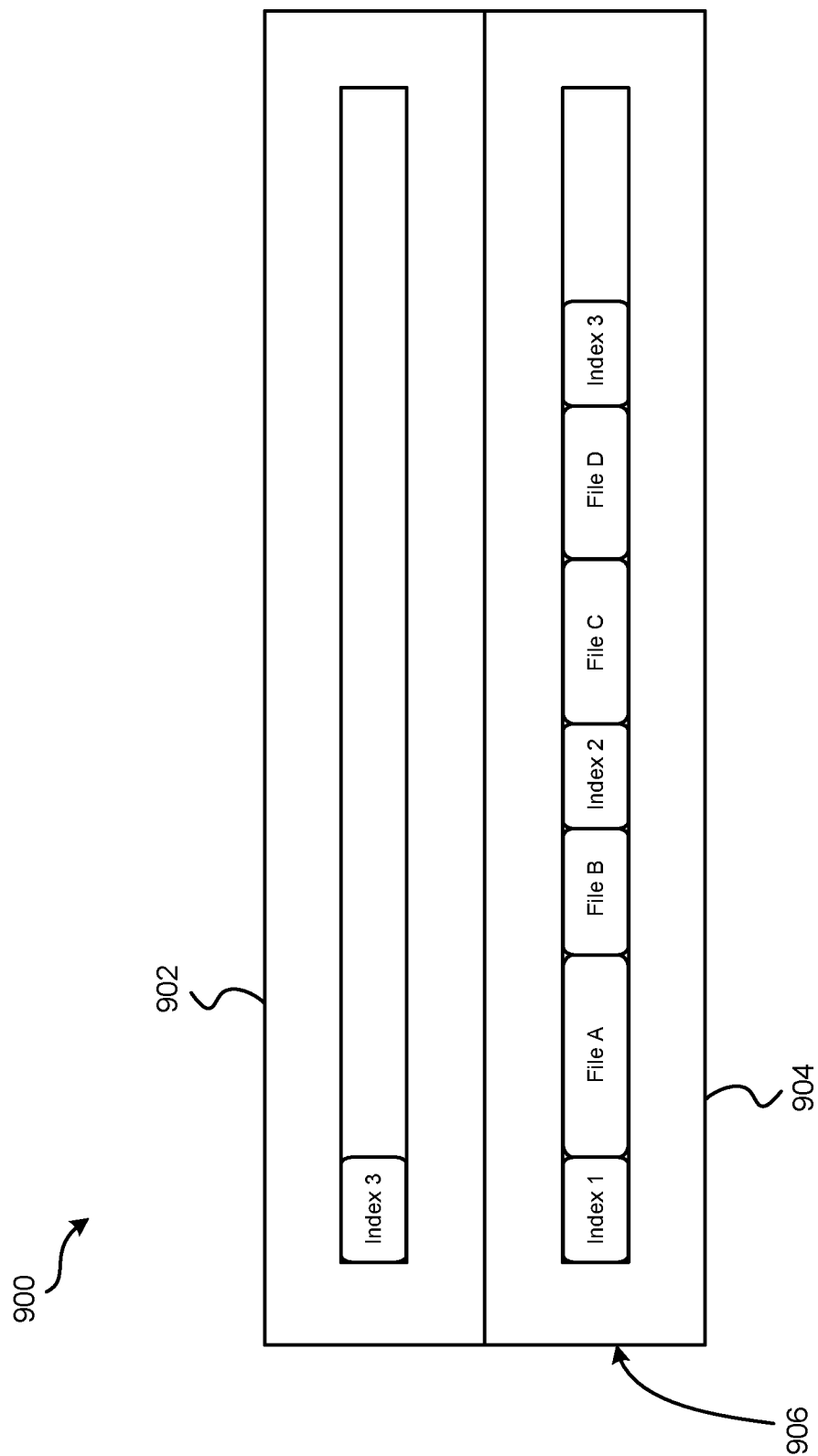
FIG. 9 is a representational diagram of files and indexes stored on a magnetic tape according to one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

While magnetic recording tape-based storage is by far the least expensive solution for storage of large quantities of data, as mentioned above, one particular disadvantage with current tape-based storage systems is the relatively long delay between receiving a request for data and returning the actual data from tape. This delay is due in part to the nature of tape. Often, a request for data is directed to a tape that is in storage in a tape library. Upon receiving the request for the data, the cartridge having the tape with the data thereon is typically moved from storage to an available drive, upon which the cartridge is loaded into the drive, the tape is mounted, and then the tape is indexed to the location of the data. As noted above, at best, this takes several tens of seconds. By comparison, a typical hard disk drive has about a 15 second spin up time and a 5 to 10 millisecond random access-type seek time.

Various approaches of the present invention include an apparatus that is capable of serving requests for data on tape in a fraction of the time typically required for cartridge-based tape library systems, while remaining economically viable. The speed is achieved in part by operating on an array of tape spool pairs each having a magnetic recording tape thereon. A magnetic head is selectively aligned with the tape spool pair having the tape with the requested data. Because the spools are not in cartridges, but rather remain present in the apparatus, the typical cartridge loading time is eliminated. Moreover, because seek time can increase with length of tape, each tape spool pair preferably has a length of tape selected to provide a desired average seek time. Finally, because a single head can service a plurality of the tape spool pairs, and preferably all of the tape spool pairs, the deployment cost remains far below disk-based storage and solid-state storage on a cost per unit storage basis.

Figure 10:
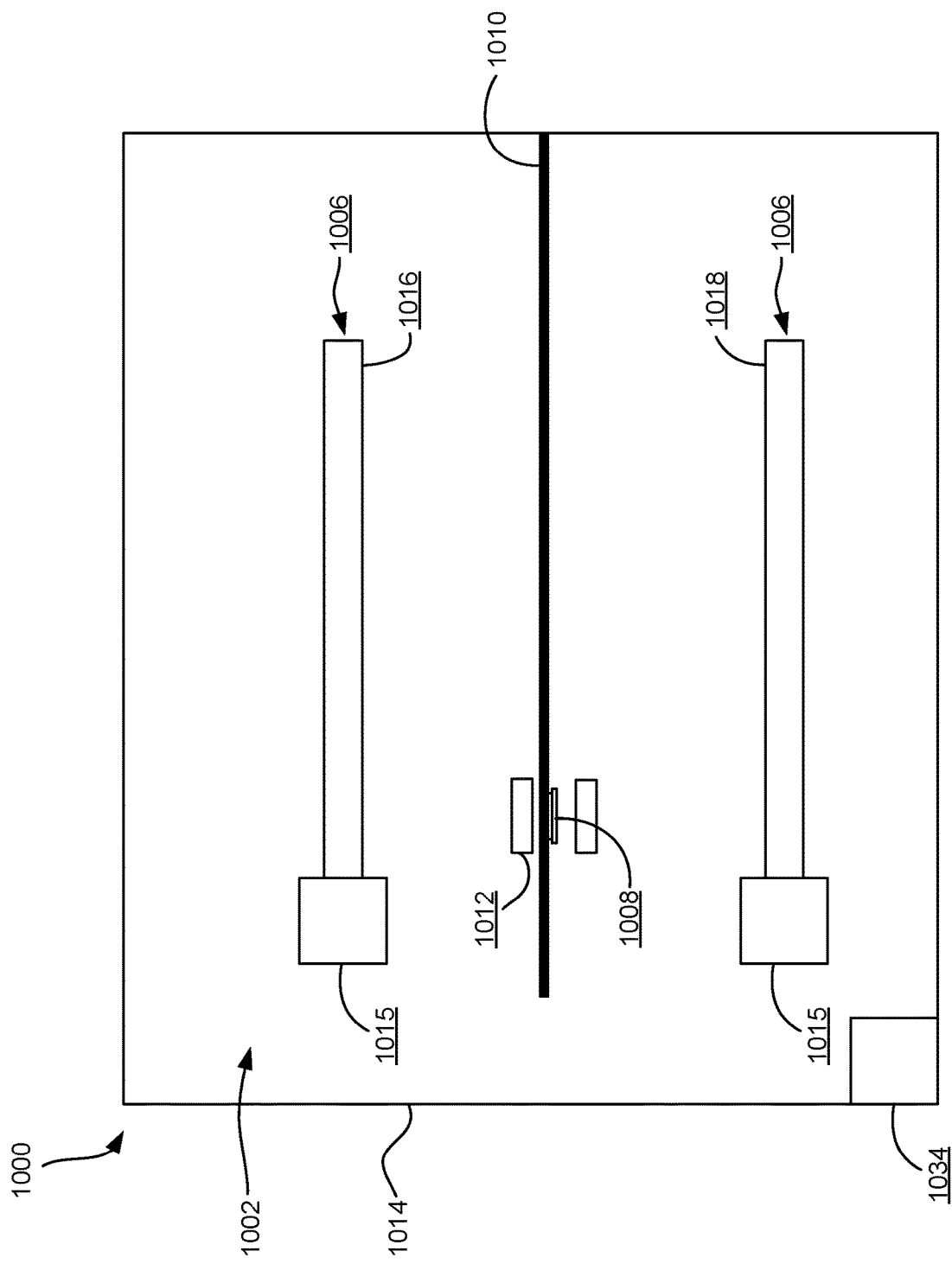
FIG. 10 is a representational view of an apparatus in accordance with one approach.
Figure 11:
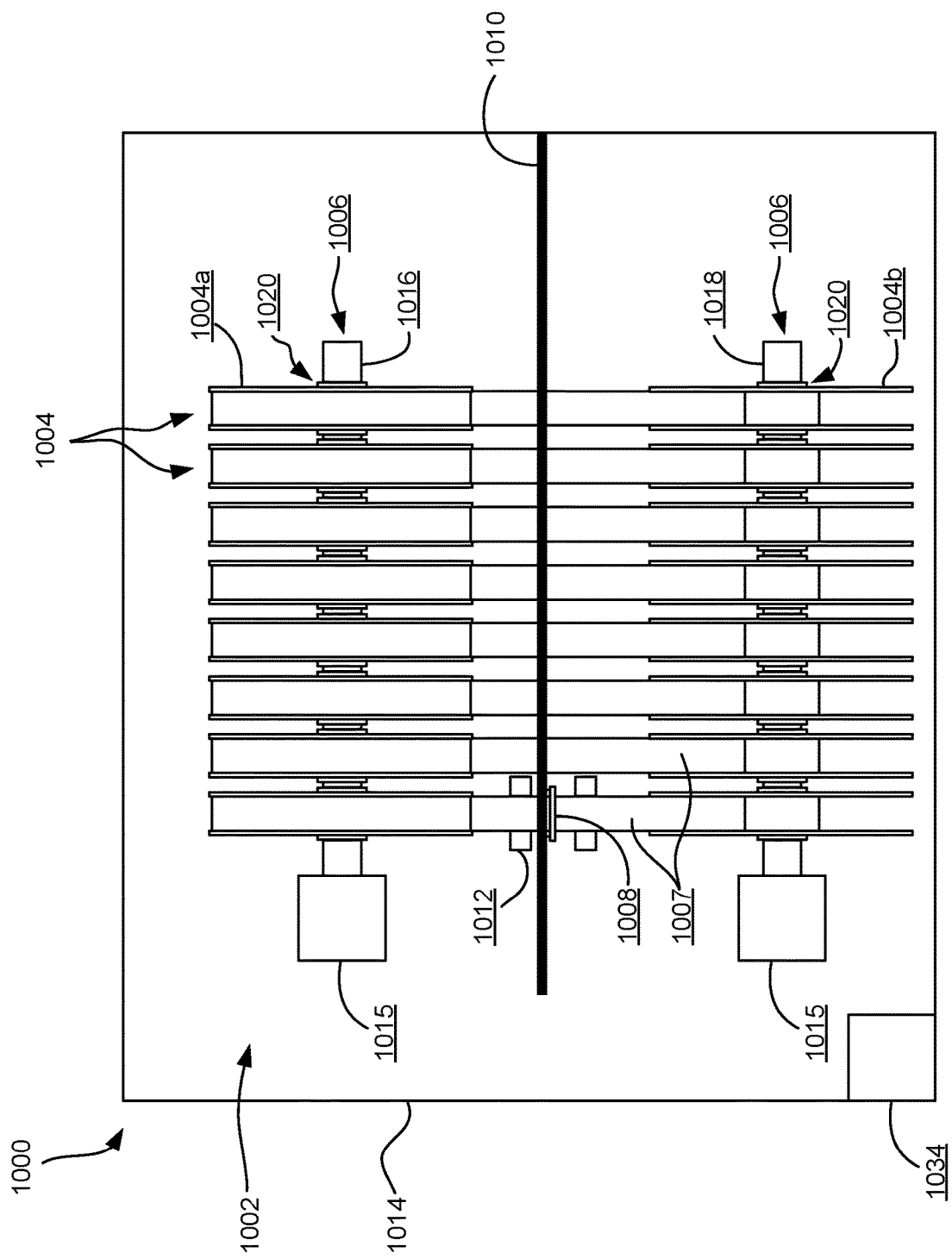
FIG. 11 is a representational view of an apparatus in accordance with one approach.

FIGS. 10 and 11 depict an apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

As shown in FIGS. 10 and 11, the apparatus 1000 includes a receiving area 1002 configured to receive a plurality of tape spool pairs 1004. FIG. 10 depicts the apparatus 1000 without tape spool pairs in the receiving area 1002. FIG. 11 depicts the apparatus 1000 without tape spool pairs 1004. With continued reference to FIGS. 10 and 11, a drive mechanism 1006 is configured to selectively drive the tape spool pairs 1004. A magnetic head 1008 is configured to perform data operations on magnetic recording tapes 1007 of the tape spool pairs 1004. A positioning mechanism 1010 is configured to selectively align the magnetic head to a selected one of the tape spool pairs 1004 so that data operations may be performed. The engagement mechanism 1012 is configured to create a relative movement between the magnetic head 1008 and a magnetic recording tape 1007 of the selected one of the tape spool pairs 1004 for engaging the magnetic recording tape 1007 with the magnetic head 1008.

The receiving area 1002 may be of any desired and/or practical size. In general, it should be large enough to accommodate the desired number of tape spool pairs 1004 usable at a given time in the apparatus 1000. The receiving area 1002 may be defined by the interior of a housing 1014 of the apparatus 1000 in some approaches. The receiving area 1002 may be enclosed, open on top, accessible via a hatch in the housing 1014, etc. In some aspects, tape spool pairs 1004 are mounted into the receiving area 1002, and thus are not readily detachable. In the approach depicted, axles 1016, 1018 extend through a respective row of spools for supporting the spools.

In other aspects, tape spool pairs 1004 are readily removable from the receiving area 1002.

Referring to FIG. 11, each tape spool pair 1004 includes a pair of spools 1004a, 1004b with a magnetic recording tape 1007 thereon. Any length of tape 1007 may be used in various approaches, as long as it fits on each spool. However, the maximum seek time for a given tape 1007 is proportional to its maximum length, e.g., the longest seek time occurs when a tape 1007 is wound entirely onto one spool and the desired data is accessible once the tape 1007 is wound almost entirely onto the other spool. Accordingly, the length of tape 1007 is preferably selected to provide a desired average or maximum seek time. By way of example, assuming a seek rate of 12 meters per second, a 360-meter-long tape 1007 should provide about a 15 second average seek time to access a single data object anywhere on the tape 1007.

Similarly, the tape 1007 may have any desired width. In general, wider tapes 1007 can accommodate more data tracks, and therefore should be able to store more data per unit or tape length. A standard LTO tape is currently one-half inch wide. Such tape 1007 may be used in some approaches. In other approaches, the tape 1007 may be wider (e.g., about 1 inch wide, about 2 inches wide, about 4 inches wide, etc.) or narrower (e.g., about ⅓ inch wide, ¼ inch wide, etc.).

The tape 1007 may have any type of formatting. In a preferred approach, the tape 1007 is LTO compliant.

The tape spool pairs 1004 are driven by the drive mechanism 1006. Any suitable type of drive mechanism 1006 may be used in various aspects, including known types of drive mechanisms 1006 adapted for use with the apparatus 1000 according to the teachings herein. Various exemplary drive mechanisms 1006 are presented below. As with any illustrative or exemplary component presented herein, this is done by way of example only and without intending to be limiting in any manner.

In one approach, the drive mechanism 1006 drives all spools simultaneously. However, such configuration is not preferred due to the inertia of so many spools with tape 1007 thereon. Rather, in preferred approaches, the drive mechanism 1006 is configured to drive no more than three tape spool pairs 1004 at a time, and more preferably no more than two tape spool pairs 1004 at a time, and ideally, no more than one tape spool pair 1004 at a time. This reduces the total mass to be driven, thereby saving power due to lower inertia relative to driving all spools 1004a, 1004b on one side of the apparatus 1000, improving response time, etc.

The drive mechanism 1006 in most approaches drives the spools 1004a, 1004b of a tape spool pair 1004 independently, as the relative rotational velocity of each spool 1004a, 1004b varies as tape 1007 moves between the spools 1004a, 1004b in a given tape spool pair 1004. Accordingly, the drive mechanism 1006 preferably includes at least two motors 1015 coupled to associated drive components. The motors 1015 may be controlled using similar algorithms as used in known tape drives.

Moreover, while in most approaches, the drive components driving the spools 1004a, 1004b may be of similar or the same type, in other approaches, different drive components may be used together, e.g., one set of spools 1004a, 1004b may be driven by a common axle 1016, 1018 while the cooperating spools 1004a, 1004b may each be driven by an individual motor 1015.

In the exemplary approach shown in FIG. 10, the drive mechanism 1006 rotates the axles 1016, 1018 extending through a respective row of spools 1004a, 1004b. As noted above, the axles 1016, 1018 may drive all, multiple, or one of the spools 1004a, 1004b at a time.

In one approach, the axles 1016, 1018 may be comprised of multiple sections, each section being independently drivable for rotating one or more spools 1004a, 1004b coupled thereto. For example, each spool may be coupled to a unique axle section. In another aspect, two, three, or more spools 1004a, 1004b are coupled to a unique axle section. Each axle section may be selectively, independently drivable, e.g., using a clutch, using a motor dedicated to each axle section, by positioning a motor to drive an axle section, etc.

A clutch 1020 of known type may be included for engaging each axle 1016, 1018 to a selected, respective one (or more) of the spools 1004a, 1004b. Accordingly, when the clutch 1020 is engaged, only the desired spool(s) 1004a, 1004b rotate with the axle 1016. In some approaches, a unique clutch 1020 may be provided for each spool 1004a, 1004b. In other approaches, a clutch 1020 may be moved to cause engagement of the axle 1016, 1018 with the spool 1004a, 1004b of interest.

In addition, a lock down mechanism of any type, e.g., a brake, a gear, etc. may be engaged with the spools 1004a, 1004b that are not currently being operated on for preventing rotation thereof.

Figure 12:
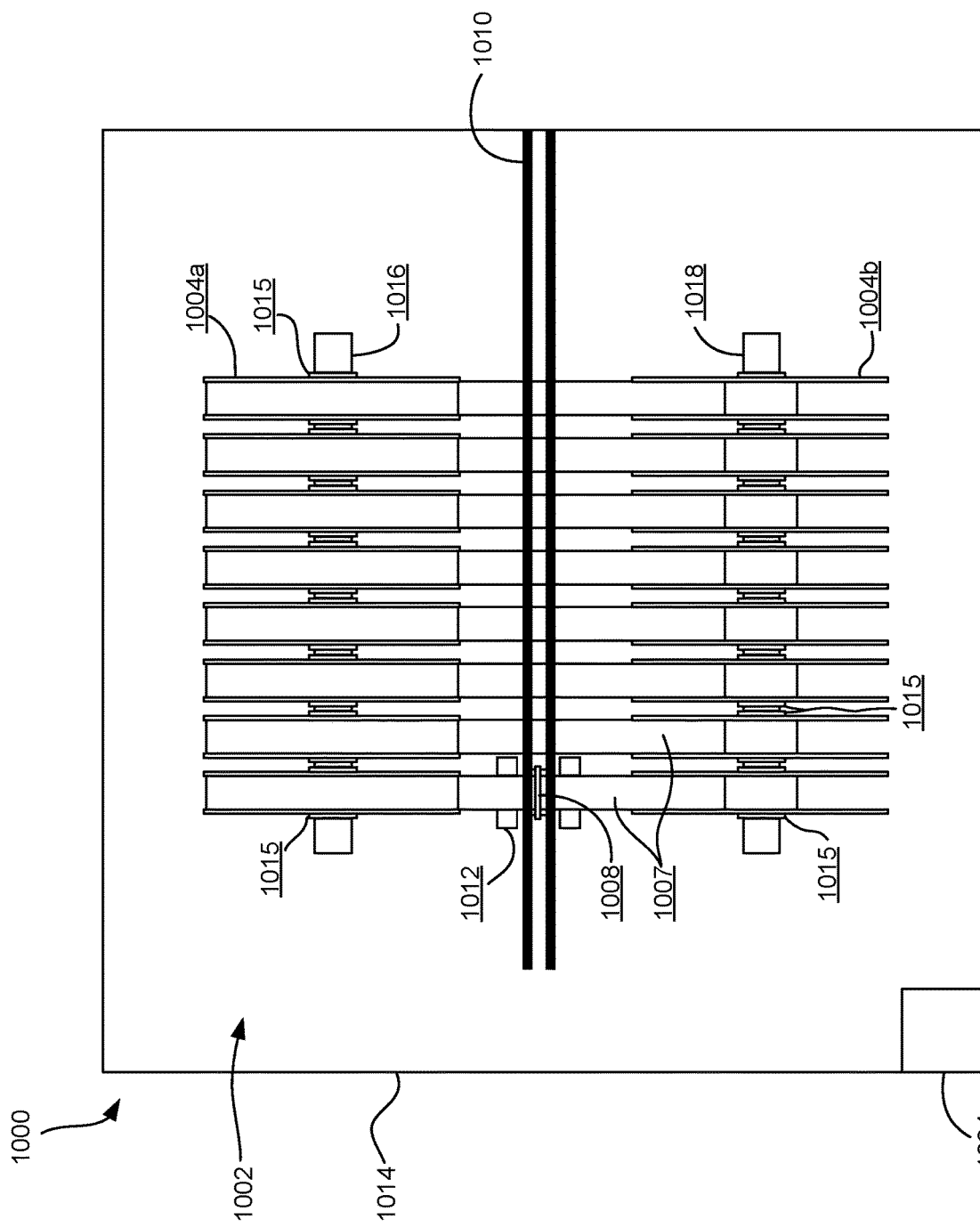
FIG. 12 is a representational view of an apparatus in accordance with one approach.

FIG. 12 depicts the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Referring to FIG. 12, the apparatus 1000 includes a drive mechanism having a plurality of motors 1015, each motor 1015 being coupled to a respective one of the spools 1004a, 1004b of the tape spool pairs 1004 at the center thereof. In one aspect, each spool 1004a, 1004b has a dedicated motor 1015. In another aspect, one motor 1015 may drive a subset of the spools 1004a, 1004b together, e.g., two or three adjacent spools 1004a, 1004b.

Figure 13A:
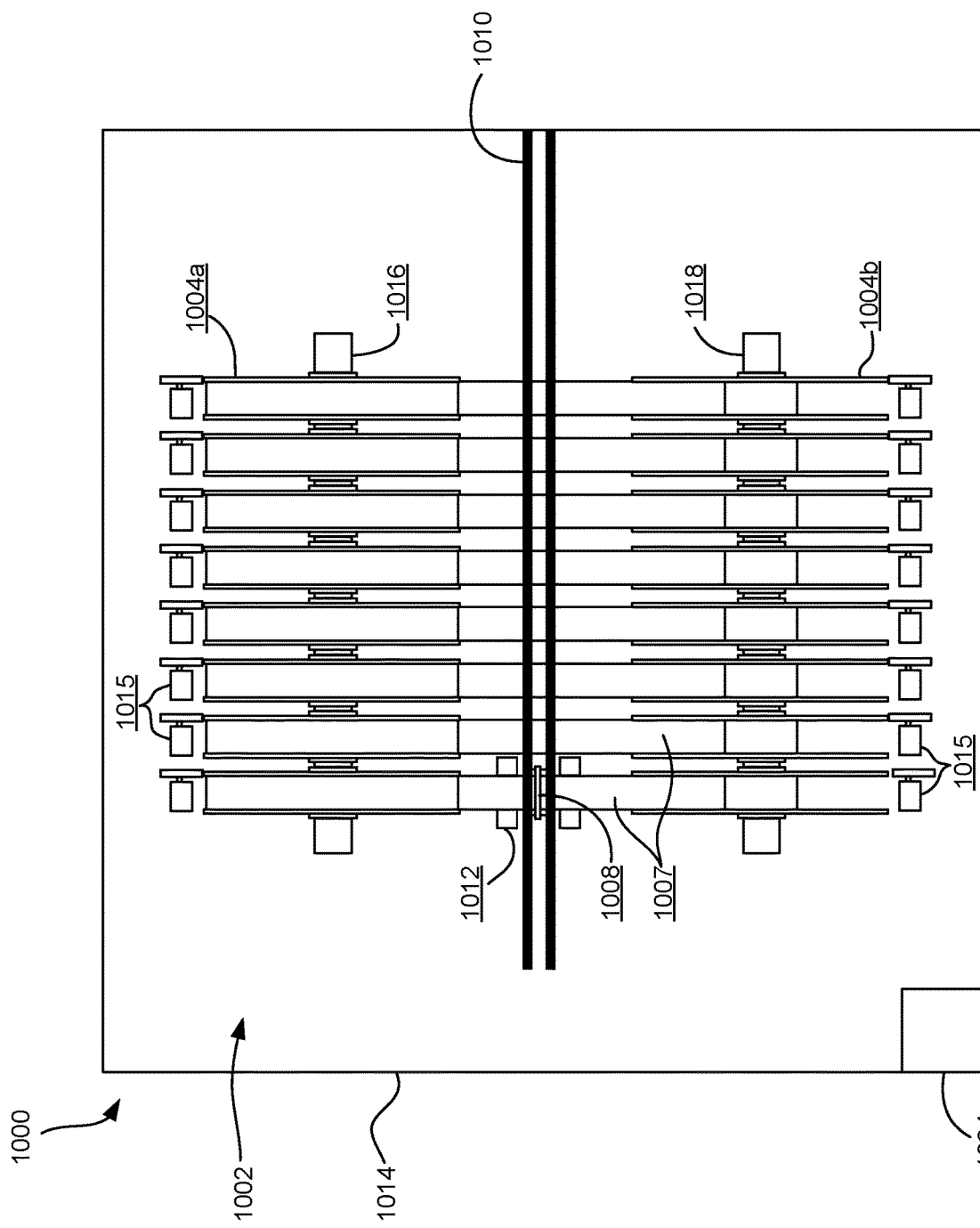
FIG. 13A is a representational view of an apparatus in accordance with one approach.

FIG. 13A depicts the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Referring to FIG. 13A, the apparatus 1000 includes a drive mechanism 1006 having a plurality of motors 1015, each motor 1015 being coupled to a respective one of the spools 1004a, 1004b of the tape spool pairs 1004. In one aspect, each spool 1004a, 1004b has a dedicated motor 1015. In another aspect, one motor 1015 may drive a subset of the spools 1004a, 1004b together, e.g., two or three adjacent spools 1004a, 1004b.

Figure 13B:
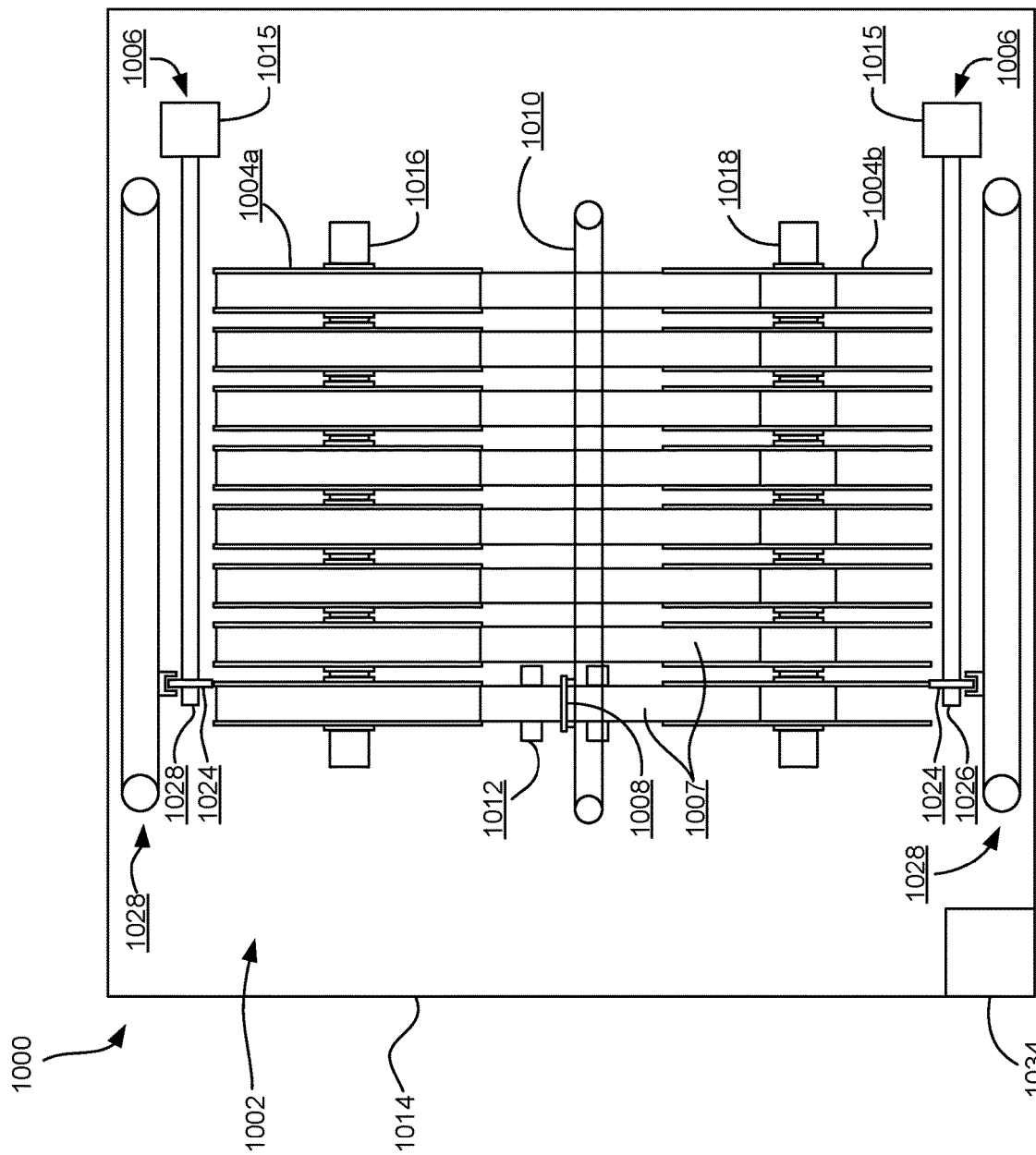
FIG. 13B is a representational view of an apparatus in accordance with one approach.

FIG. 13B depicts the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Referring to FIG. 13B, the apparatus 1000 includes a drive mechanism 1006 having, for each row of spools 1004a, 1004b, a drive wheel 1024 driven by a drive axle 1026. The drive wheel 1024 may have any type of configuration, such as a toothed wheel (gear), a rubber-edged wheel that engages the spool 1004a, 1004b via frictional engagement, etc. In one aspect, the drive wheel 1024 is selectively positionable along the drive axle 1026. A positioner 1028 moves the drive wheel 1024 to align the drive wheel 1024 with the spool 1004a, 1004b of interest. A belt-driven positioner 1028 having a u-shaped gear engaging piece is shown, though any other type of positioner may be used.

As should now be apparent, many other types of drive mechanisms 1006 may be employed in the apparatus 1000 without straying from the spirit and scope of the present invention.

The magnetic head 1008 may be of conventional design such as one having reading and/or writing modules, etc. Likewise, additional conventional components for proper head 1008 positioning and operation may be included in the apparatus 1000, such as coarse and fine actuators, cabling, servo and data processing circuitry, etc.

Figure 13C:
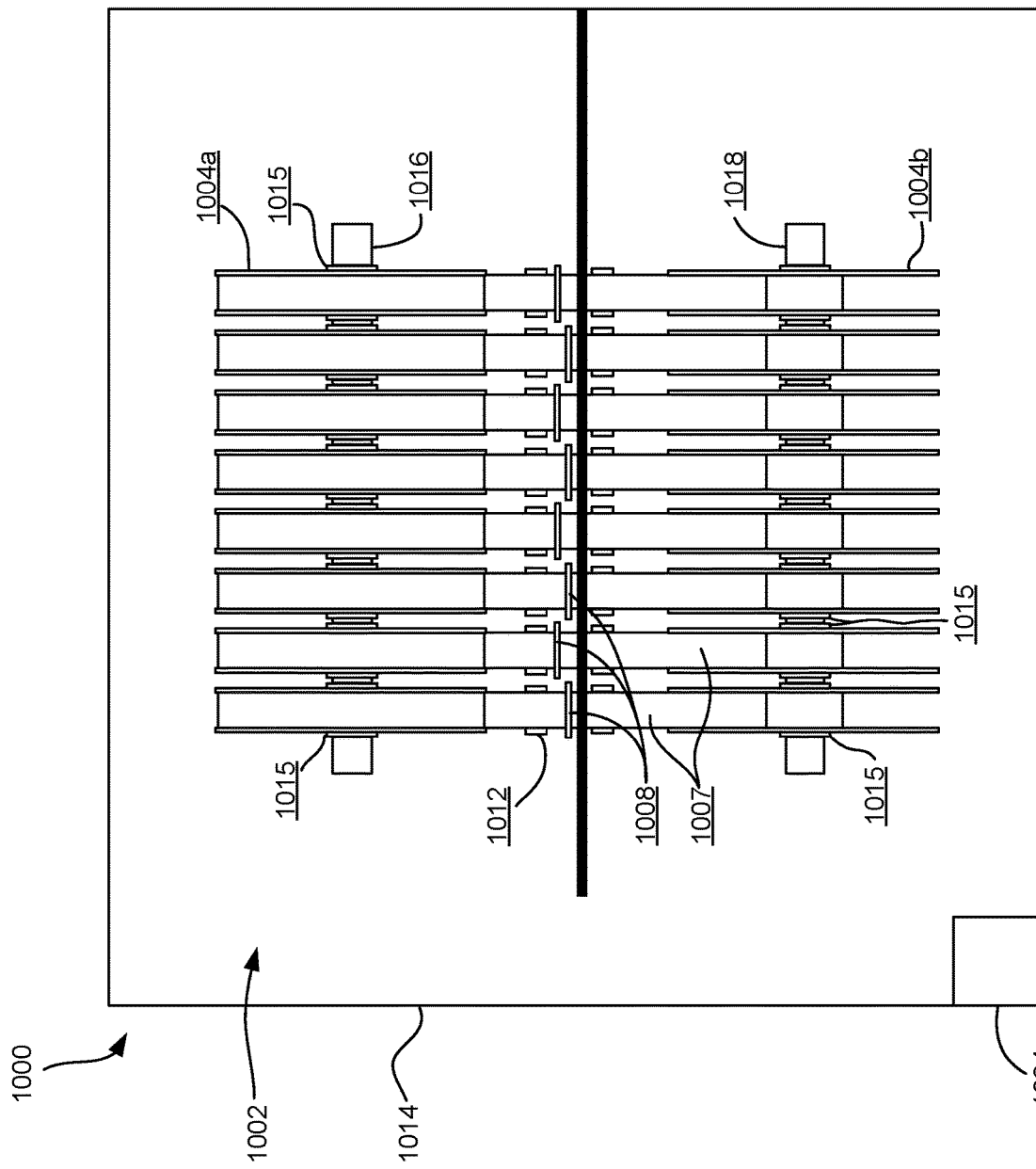
FIG. 13C is a representational view of an apparatus in accordance with one approach.

In addition, in various approaches, multiple heads 1008 and associated hardware/circuitry may be present, thereby enabling performance of multiple data operations simultaneously. In one aspect, the number of heads 1008 may be equal to the number of tape spool pairs 1004, as shown in FIG. 13C. In some approaches, the heads may share data channel and/or other electronics. In other approaches, the heads 1008 may have dedicated data channel and/or other electronics.

The positioning mechanism 1010 is configured to selectively align the magnetic head 1008 to a selected one of the tape spool pairs 1004 so that data operations may be performed. Any suitable type of positioning mechanism 1010 may be used, including known types of positioning mechanisms 1010 adapted for use with the apparatus 1000 according to the teachings herein.

In one exemplary approach, the positioning mechanism 1010 includes a guide of any type along which the magnetic head 1008 is positionable. Exemplary guides include, but are not limited to, a rail along which the magnetic head 1008 slides, a groove along which the magnetic head 1008 slides or rolls, a track along which the magnetic head 1008 slides or rolls, etc. Any type of positioning scheme may be used to move the magnetic head 1008 along the guide. In one approach, a worm screw is configured to move the magnetic head 1008 along the guide. In another approach, the positioning mechanism 1010 includes a belt coupled to the magnetic head 1008. Positioning mechanisms 1010 such as those used in inkjet printers to move a print head, e.g., along a guide, may be adapted for use with positioning the magnetic head 1008, as would become apparent to one skilled in the art upon reading the present disclosure. FIG. 13B depicts a belt-driven positioning mechanism 1010, for example.

As should now be apparent, many other types of positioning mechanisms 1010 may be employed in the apparatus 1000 without straying from the spirit and scope of the present invention.

The engagement mechanism 1012 is configured to create a relative movement between the magnetic head 1008 and a magnetic recording tape 1007 of the selected one of the tape spool pairs 1004 for engaging the magnetic recording tape 1007 with the magnetic head 1008. Any suitable type of engagement mechanism 1012 may be used, including known types of engagement mechanisms 1012 adapted for use with the apparatus 1000 according to the teachings herein.

Figure 14A:
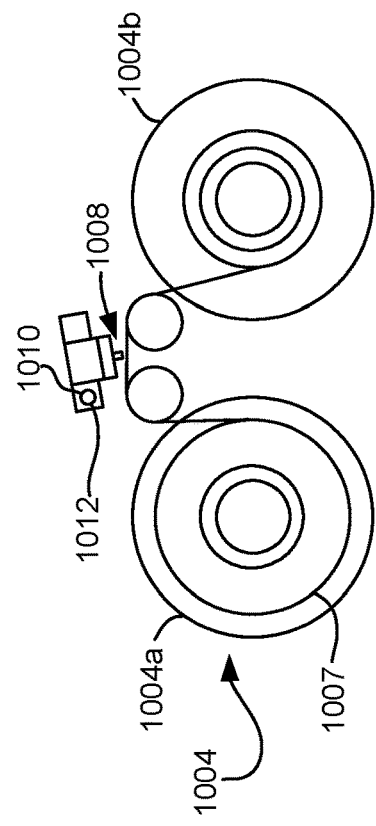
FIGS. 14A and 14B are representational views of an apparatus in accordance with one approach.
Figure 14C:
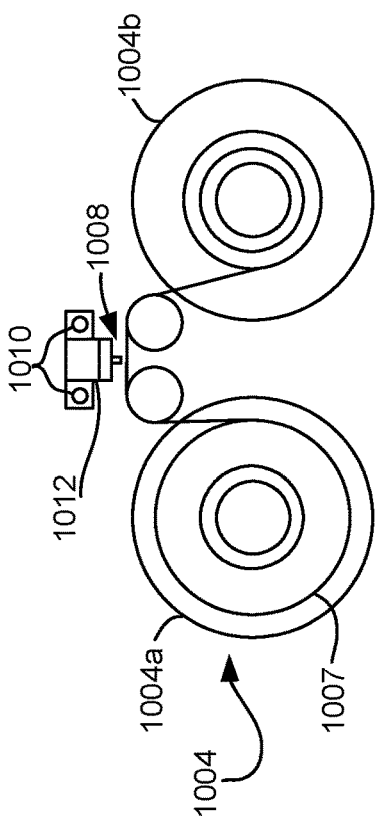
FIGS. 14C and 14D are representational views of an apparatus in accordance with one approach.
Figure 14B:
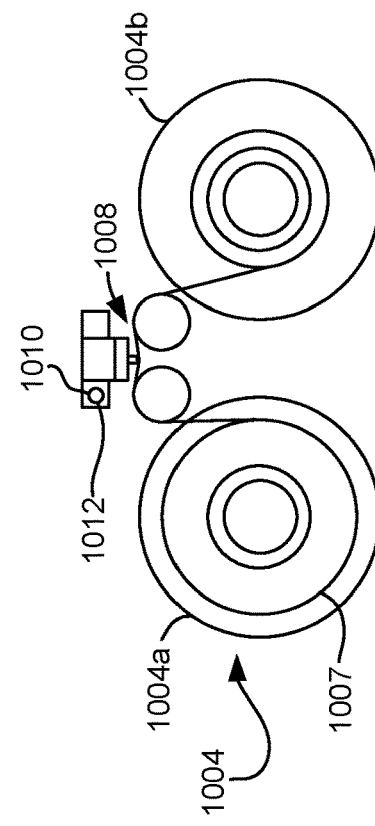

FIGS. 14A and 14B depict the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Referring to FIGS. 14A and 14B, the engagement mechanism 1012 is configured to move the magnetic head 1008 toward the magnetic recording tape 1007. For example, an actuator may be used to translate the magnetic head 1008 into engagement with a tape 1007 extending between the spools 1004*a*, 1004*b*.

Figure 14D:
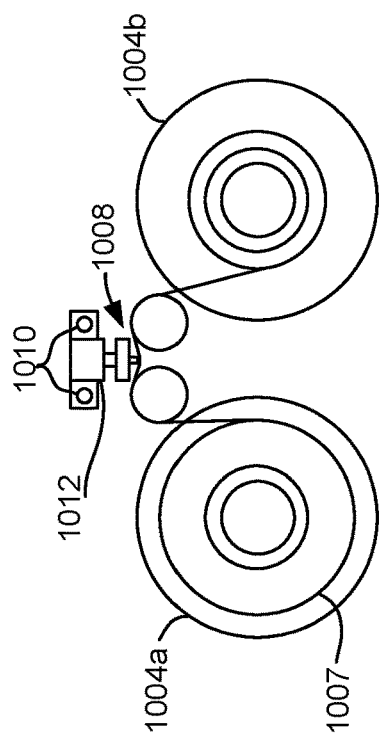

FIGS. 14C and 14D depict the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Referring to FIGS. 14C and 14D, the engagement mechanism 1012 is configured to move the magnetic head 1008 toward the magnetic recording tape 1007. For example, the positioning mechanism 1010 or other mechanisms may be used to pivot the magnetic head 1008 into engagement with a tape 1007 extending between the spools 1004*a*, 1004*b*.

Figure 15A:
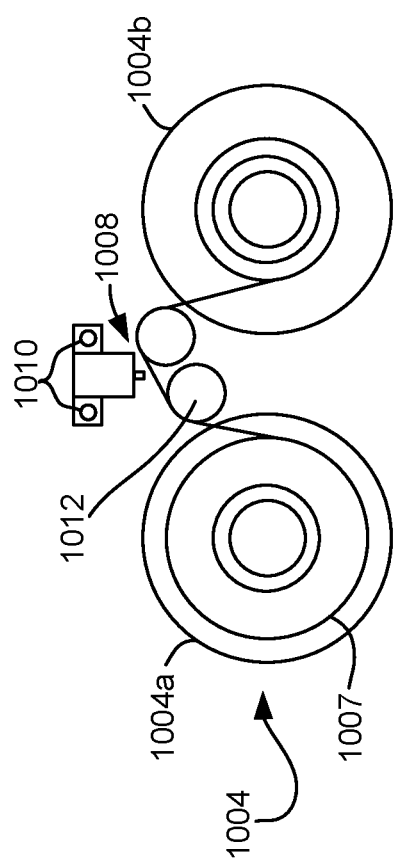
FIGS. 15A and 15B are representational views of an apparatus in accordance with one approach.
Figure 15B:
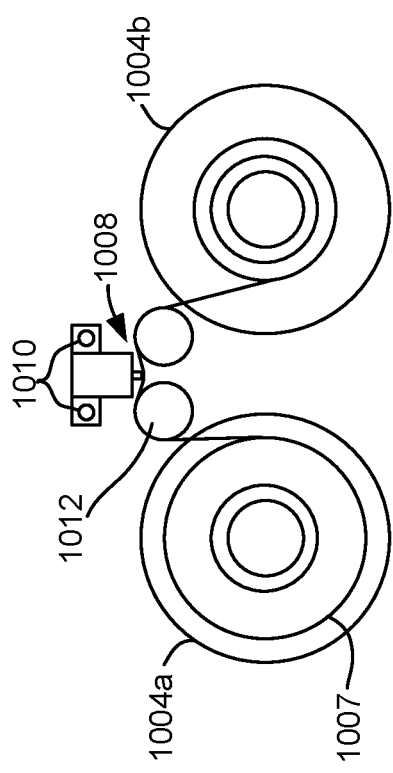

FIGS. 15A and 15B depict the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Referring to FIGS. 15A and 15B, the engagement mechanism 1012 depicted is configured to move the magnetic recording tape 1007 toward the magnetic head 1008 to engage the tape 1007 with the magnetic head 1008. In the approach shown in the transition from FIG. 15A to FIG. 15B, one tape guide is moved from a retracted position (FIG. 15A) to a deployed position (FIG. 15B), thereby lifting the tape 1007 into engagement with the magnetic head 1008. The retracted position allows the magnetic head 1008 to move past the tape 1007, e.g., to an adjacent tape 1007. An actuator may be used to move the tape guide. In another approach, both tape guides may be repositioned.

As should now be apparent, many other types of engagement mechanisms 1012 may be employed in the apparatus 1000 without straying from the spirit and scope of the present invention.

FIGS. 15A and 15B depict the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

Figure 16:
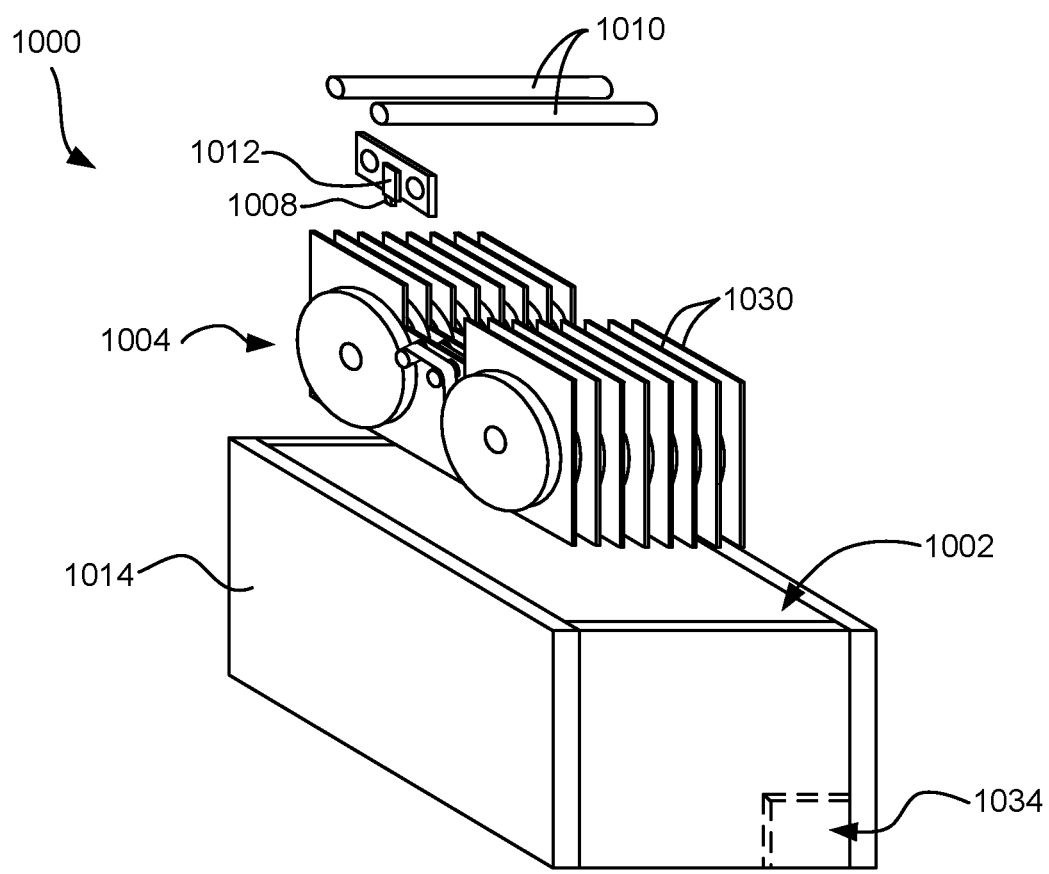
FIG. 16 is a representational view of an apparatus in accordance with one approach.

FIG. 16 depicts the apparatus 1000 in accordance with one approach. As an option, the present apparatus 1000 may be implemented in conjunction with features from any other approach listed herein, such as those described with reference to the other FIGS. Of course, however, such apparatus 1000 and others presented herein may be used in various applications and/or in permutations which may or may not be specifically described in the illustrative approaches listed herein. Further, the apparatus 1000 presented herein may be used in any desired environment.

As shown, each tape spool pair 1004 is coupled to a removable mount 1030 that is selectively insertable in the receiving area 1002. This approach allows easier insertion and removal of the tape spool pairs 1004 from the housing 1014.

The mount 1030 is configured to support at least one tape spool pair 1004 thereon. As shown, each mount 1030 has one tape spool pair 1004 thereon. In some aspects, each mount 1030 may have two tape spool pairs 1004 thereon, e.g., one tape spool pair 1004 on each side of a plate. The tape spool pair 1004 may be permanently mounted on the mount 1030, or the mount 1030 may be configured to permit selective attachment of a tape spool pair 1004 thereto and selective detachment of a tape spool 1004 therefrom. Any known coupling mechanism for permanent or detachable mounting may be used.

The apparatus 1000 may have other features as described elsewhere herein, such as an engagement mechanism 1012, a drive mechanism 1006, etc. For example, the drive mechanism 1006 may include axles that extends through each row of tape spool and drive motors coupled to the axles. In another aspect, the drive mechanism 1006 may include individual motors, positionable motors (e.g., positionable using a belt, worm screw, etc.), etc. that drive individual spools or smaller groups of spools.

As also shown in FIG. 16, the positioning mechanism 1010 includes a guide along which the magnetic head 1008 is positionable for aligning the magnetic head 1008 with a tape 1007 of interest. A worm screw may be used to move the magnetic head 1008 along the guide. In other approaches, the positioning mechanism 1010 may have any other configuration described herein. For example, the positioning mechanism 1010 may include a belt coupled to the magnetic head 1008, e.g., for moving the magnetic head 1008 along a guide.

FIG. 17A illustrates a detailed view of a removable mount 1030 in accordance with one aspect. A notch 1032 may be provided to allow the magnetic head 1008 to pass thereby. In other approaches, a notch may not be present. In any approach, an engagement mechanism 1012 may be present to lift the tape 1007 up to the magnetic head 1008 and/or lower the head 1008 to the tape 1007.

Figure 17B:
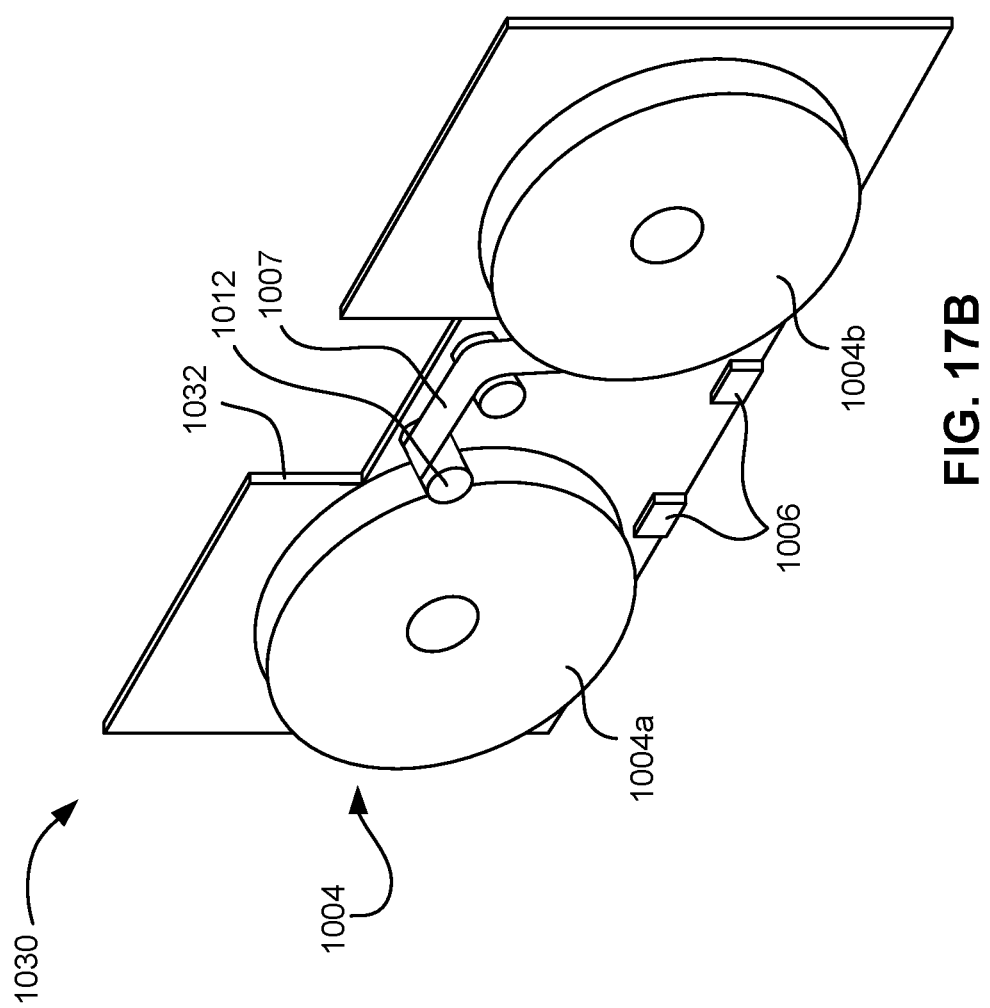
FIG. 17B is a representational view of a removable mount of FIG. 16 in accordance with another approach.

FIG. 17B depicts a removable mount 1030 in accordance with another approach. In the approach shown, the mount 1030 includes a drive mechanism 1006 configured to selectively drive the tape spool pairs 1004. As shown, the drive mechanism 1006 includes a plurality of motors, each motor being coupled to a respective one of the spools of the tape spool pair 1004, e.g., directly, via belts, gears, wheels, etc. In a preferred approach, the drive mechanism 1006 is a direct drive mechanism whereby the motors are integral to the mount 1030 for directly driving the respective spool 1004a, 1004b.

Each mount 1030 includes an engagement mechanism 1012 in some approaches. The engagement mechanism 1012 may have any desired configuration. See, e.g., FIGS. 15A-15B for exemplary operation of one possible engagement mechanism 1012, which in the aspect depicted in FIGS. 15A-15B selectively moves the magnetic recording tape 1007 toward the magnetic head 1008.

Figure 17C:
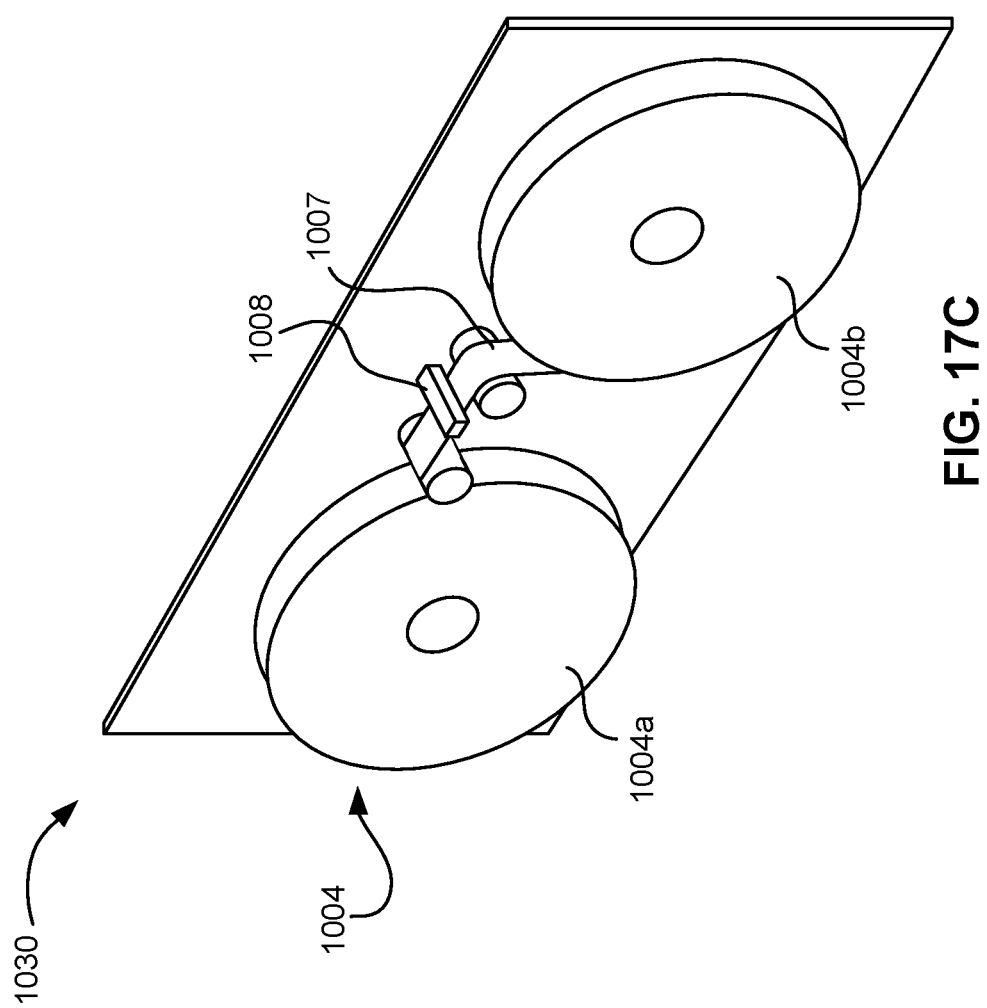
FIG. 17C is a representational view of a removable mount of FIG. 16 in accordance with another approach.

In yet another approach, each mount 1030 may include a magnetic head 1008 and associated actuator, cables, etc., as shown in FIG. 17C.

Referring to FIGS. 10-17C, apparatus 1000 in accordance with any approach described herein preferably includes a controller 1034 that performs one or more of the following functions: controls operation of one or more of the apparatus components, maintains an index of the data on the tape 1007, service read requests, selects one of the tapes 1007 for servicing write requests, etc. The controller 1034 may be onboard the apparatus 1000, external thereto, etc. For example, an onboard controller 1034 may be electrically coupled to each of the various apparatus components and programmed to provide the desired apparatus functionality.

The apparatus 1000 and/or controller 1034 may be configured to function with existing storage software, storage controllers, etc. For example, the apparatus 1000 may be configured to appear to a host and/or storage controller as a conventional data storage drive, thereby enabling use of the apparatus 1000 with existing storage software. Known techniques adapted for this purpose may be used.

The apparatus 1000 itself may be dimensioned for mounting in a computer rack, or in any other environment, enclosure, etc.

An array of apparatuses 1000 may be provided to work in concert, thereby providing a system capable of storing massive quantities of data with seek times rivalling current disk-based data storage systems. Accordingly, such systems incorporating an array of the apparatuses 1000 are usable for cloud storage, enterprise-level storage, etc. One skilled in the art, now armed with the teachings herein, will appreciate that known data storage system control and interface technology may be adapted for use with and/or control of such multi-apparatus systems.

Figure 18:
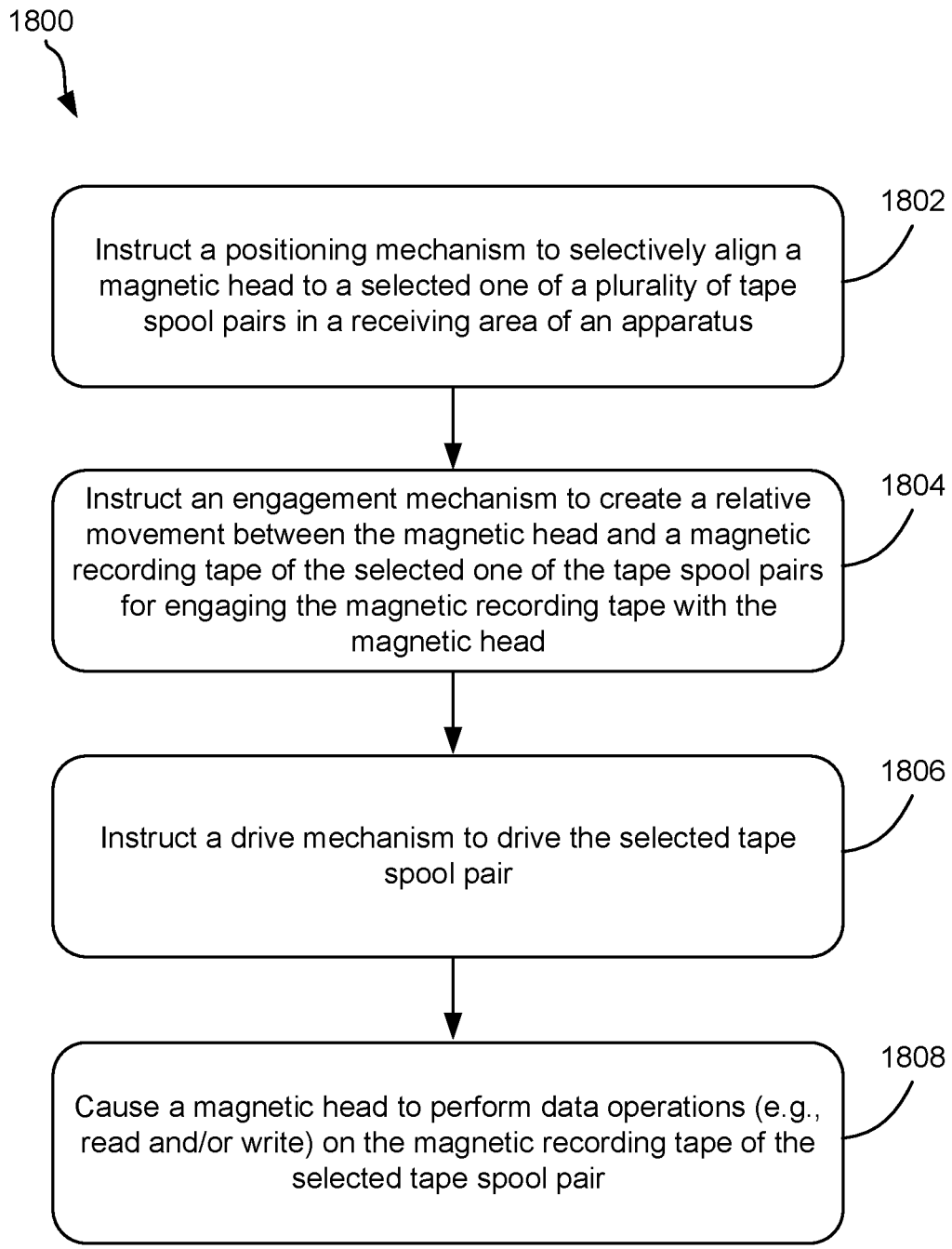
FIG. 18 is a flowchart of a method in accordance with one approach.

Now referring to FIG. 18, a flowchart of a method 1800 is shown according to one approach. The method 1800 may be performed in accordance with the present invention in any of the environments depicted in FIGS. 1-17C, among others, in various approaches. Of course, more or fewer operations than those specifically described in FIG. 18 may be included in method 1800, as would be understood by one of skill in the art upon reading the present descriptions.

Each of the steps of the method 1800 may be performed by any suitable component of the operating environment. For example, in various approaches, the method 1800 may be partially or entirely performed by apparatus 1000 and/or controller 1034 or some other device having one or more processors therein. The processor, e.g., processing circuit(s), chip(s), and/or module(s) implemented in hardware and/or software, and preferably having at least one hardware component may be utilized in any device to perform one or more steps of the method 1800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 18, method 1800 includes operation 1802, in which a positioning mechanism 1010 is instructed to selectively align a magnetic head 1008 to a selected one of a plurality of tape spool pairs 1004 in a receiving area 1002 of an apparatus 1000. The positioning mechanism 1010 may include any feature described in the exemplary approaches above with reference to FIGS. 10-17C.

In operation 1804, an engagement mechanism 1012 is instructed to create a relative movement between the magnetic head 1008 and a magnetic recording tape 1007 of the selected one of the tape spool pairs 1004 for engaging the magnetic recording tape 1007 with the magnetic head 1008. The engagement mechanism 1012 may include any feature described in the exemplary approaches above with reference to FIGS. 10-17C.

In operation 1806, a drive mechanism 1006 is instructed to drive the selected tape spool pair 1004. The drive mechanism 1006 may include motors 1015, e.g., as described in the exemplary approaches above with reference to FIGS. 10-17C. In one approach, instructing the drive mechanism 1006 to drive the selected tape spool pair 1004 includes instructing a pair of drive motors 1015 coupled to the selected tape spool pair 1004 to drive the selected tape spool pair 1004.

In some aspects, operation 1806 may include causing a clutch 1020 to engage the drive mechanism 1006 to a spool 1004a, 1004b of the selected tape spool pair 1004.

In operation 1808, a magnetic head 1008 is caused to perform data operations (e.g., read and/or write) on the magnetic recording tape 1007 of the selected tape spool pair 1004, e.g., in a similar manner as used in conventional tape drives.

Figure 19:
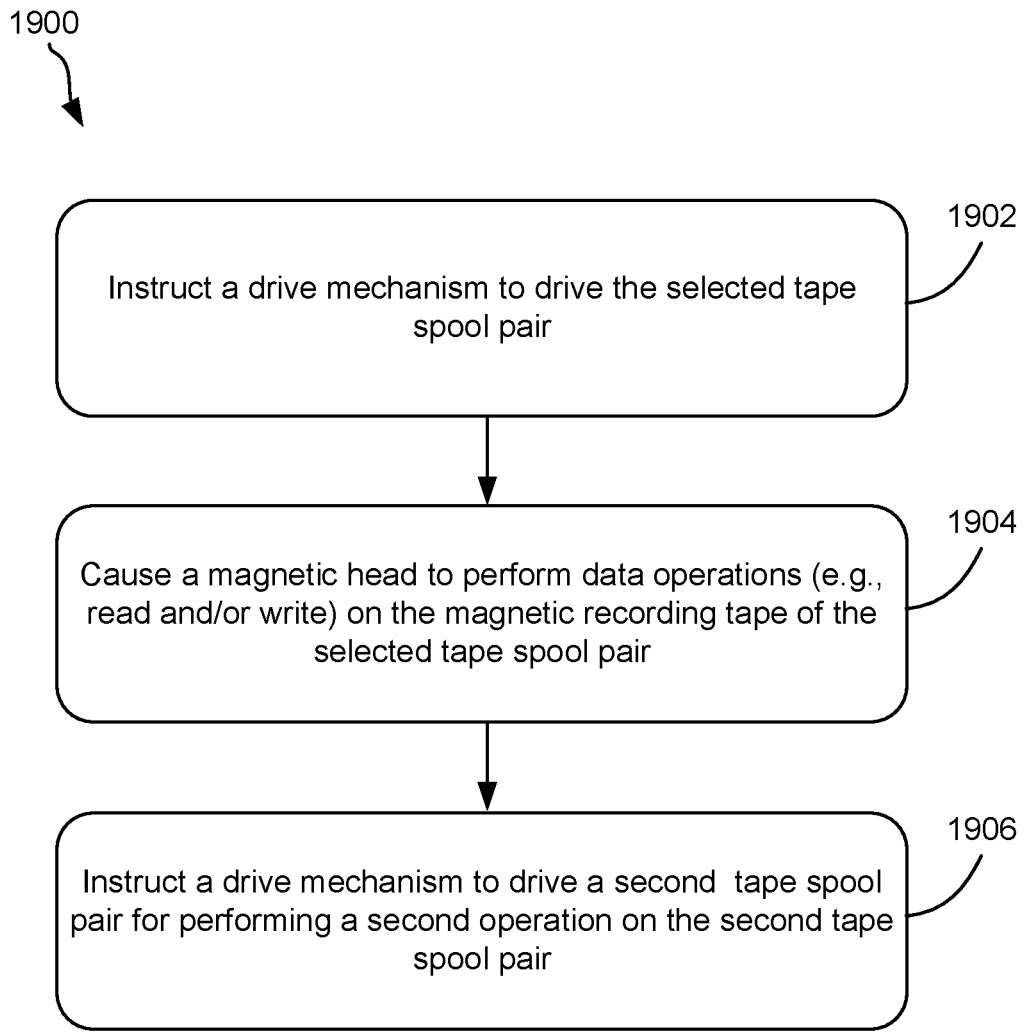
FIG. 19 is a flowchart of a method in accordance with one approach.

Now referring to FIG. 19, a flowchart of a method 1900 is shown according to one approach. The method 1900 may be performed in accordance with the present invention in any of the environments depicted in FIGS. 1-18, among others, in various approaches. Of course, more or fewer operations than those specifically described in FIG. 19 may be included in method 1900, as would be understood by one of skill in the art upon reading the present descriptions.

Each of the steps of the method 1900 may be performed by any suitable component of the operating environment. For example, in various approaches, the method 1900 may be partially or entirely performed by apparatus 1000 and/or controller 1034 or some other device having one or more processors therein. The processor, e.g., processing circuit(s), chip(s), and/or module(s) implemented in hardware and/or software, and preferably having at least one hardware component may be utilized in any device to perform one or more steps of the method 1900. Illustrative processors include, but are not limited to, a CPU, an ASIC, a FPGA, etc., combinations thereof, or any other suitable computing device known in the art.

In operation 1902, a drive mechanism 1006 is instructed to drive a selected tape spool pair 1004. The drive mechanism 1006 may include motors 1015, clutches, etc. e.g., as described in the exemplary approaches above.

In operation 1904, a magnetic head 1008 is caused to perform data operations (e.g., read and/or write) on the magnetic recording tape 1007 of the selected tape spool pair 1004, e.g., in a similar manner as used in conventional tape drives.

In operation 1906, the drive mechanism 1006 is instructed to drive a second tape spool pair 1004 for performing a second operation on the second tape spool pair 1004 while the data operations are being performed. The second operation may be any type of operation performed by a conventional tape drive. Examples of second operations include, but are not limited to, tape spool refresh operations in which the tape is transferred at low tension from one spool to the other; seek operations to move the tape of the second tape spool to an approximate position where a read and/or write operation will be performed, etc.

Operation 1906 may be performed for multiple tape spool pairs 1004.

Figure 20:
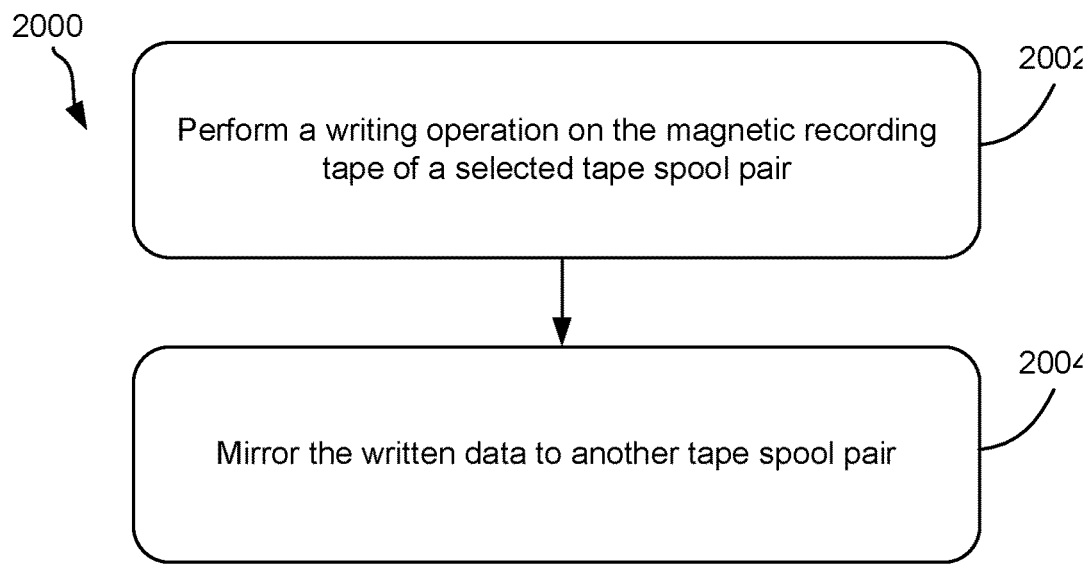
FIG. 20 is a flowchart of a method in accordance with one approach.

Now referring to FIG. 20, a flowchart of a method 2000 is shown according to one approach. The method 2000 may be performed in accordance with the present invention in any of the environments depicted in FIGS. 1-19, among others, in various approaches. Of course, more or fewer operations than those specifically described in FIG. 20 may be included in method 2000, as would be understood by one of skill in the art upon reading the present descriptions.

Each of the steps of the method 2000 may be performed by any suitable component of the operating environment. For example, in various approaches, the method 2000 may be partially or entirely performed by apparatus 1000 and/or controller 1034 or some other device having one or more processors therein. The processor, e.g., processing circuit(s), chip(s), and/or module(s) implemented in hardware and/or software, and preferably having at least one hardware component may be utilized in any device to perform one or more steps of the method 2000. Illustrative processors include, but are not limited to, a CPU, an ASIC, a FPGA, etc., combinations thereof, or any other suitable computing device known in the art.

In operation 2002, writing operations are performed on the magnetic recording tape 1007 of a selected tape spool pair 1004, e.g., in a similar manner as used in conventional tape drives.

In operation 2004, the written data is mirrored to another tape spool pair, thereby providing redundancy. The raw data may be written to the other tape spool pair, and/or any other data that enables redundancy, e.g., parity data, error correction code data, etc.

Figure 21:
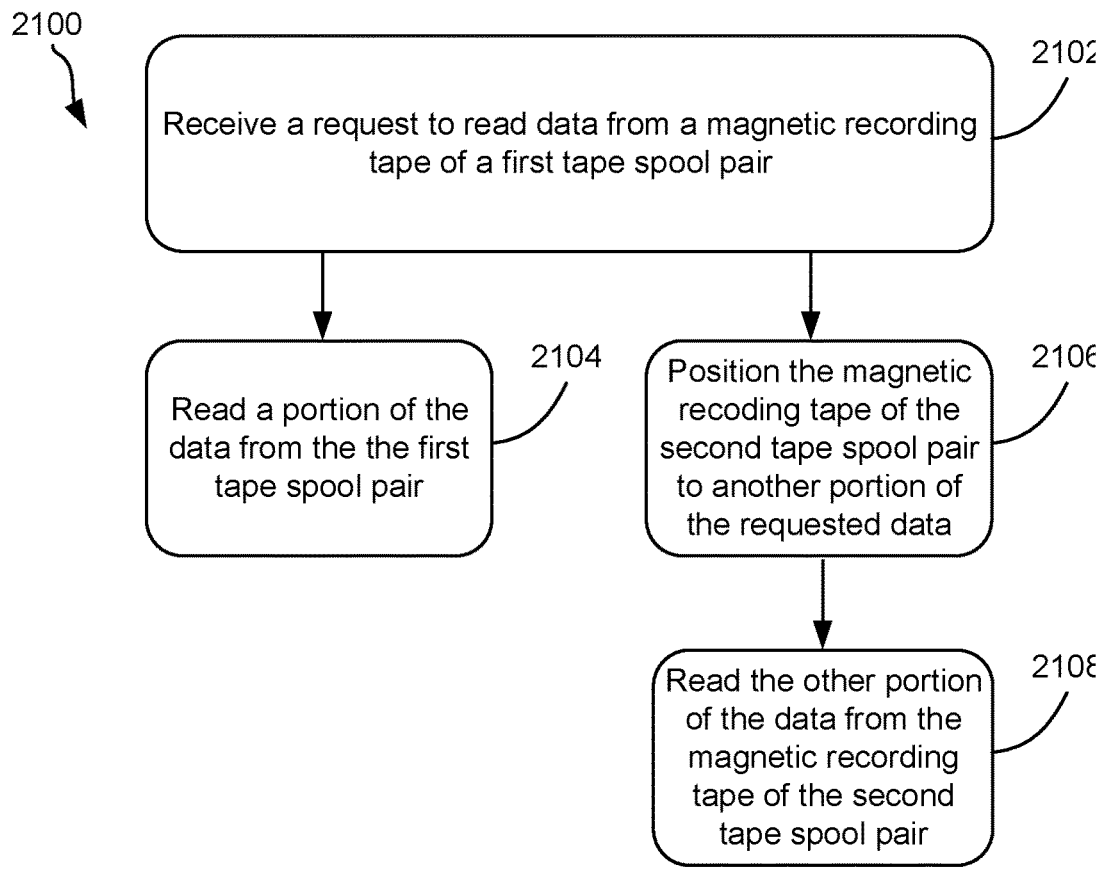
FIG. 21 is a flowchart of a method in accordance with one approach.

Now referring to FIG. 21, a flowchart of a method 2100 is shown according to one approach. The method 2100 may be performed in accordance with the present invention in any of the environments depicted in FIGS. 1-19, among others, in various approaches. Of course, more or fewer operations than those specifically described in FIG. 21 may be included in method 2100, as would be understood by one of skill in the art upon reading the present descriptions.

Each of the steps of the method 2100 may be performed by any suitable component of the operating environment. For example, in various approaches, the method 2100 may be partially or entirely performed by apparatus 1000 and/or controller 1034 or some other device having one or more processors therein. The processor, e.g., processing circuit(s), chip(s), and/or module(s) implemented in hardware and/or software, and preferably having at least one hardware component may be utilized in any device to perform one or more steps of the method 2100. Illustrative processors include, but are not limited to, a CPU, an ASIC, a FPGA, etc., combinations thereof, or any other suitable computing device known in the art.

In operation 2102, a request to read data from a magnetic recording tape 1007 of a first tape spool pair 1004, is received. In one approach, a copy of the data is also stored (mirrored) on the magnetic recording tape 1007 of a second tape spool pair. In another approach, portions of the requested data are stored across multiple tape spool pairs.

In operation 2104, a portion of the data is read from the selected tape spool pair, e.g., in a similar manner as used in conventional tape drives.

In operation 2106, while operation 2104 is being performed, the magnetic recording tape 1007 of the second tape spool pair is being positioned to an approximate starting position of another portion of the requested data.

In operation 2108, the other portion of the requested data is read from the magnetic recording tape 1007 of the second tape spool pair, e.g., in a similar manner as used in conventional tape drives. Where only one magnetic head is present in the device, the head may be moved to the second tape spool pair to read the data therefrom.

This method 2100 provides a speed advantage where the requested data is distributed in portions along a tape, e.g., due to writing in append only mode, as well as spread across multiple tapes. By positioning the magnetic recording tape of the second tape spool pair while the first portion of data is being retrieved, the second portion of the data can be accessed more quickly than, for example, spooling the magnetic recording tape of the first tape spool pair to the approximate location of the next portion of data or waiting to index the second tape spool pair until the head is available.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:
1. An apparatus, comprising:
a receiving area configured to receive a plurality of mounts;
at least three of the mounts aligned in the receiving area such that an inner mount is sandwiched between outer mounts, each mount being configured to support at least one tape spool pair thereon;

a magnetic head configured to perform data operations on magnetic recording tapes of the tape spool pairs;

the inner mount having a notch therein for allowing the magnetic head to pass therethrough from one of the outer mounts toward the other outer mount in a direction parallel to rotational axes of the tape spools;

a positioning mechanism configured to selectively align the magnetic head to a selected one of the tape spool pairs; and an engagement mechanism configured to create a relative movement between the magnetic head and the magnetic recording tape of the selected tape spool pair for engaging the magnetic recording tape with the magnetic head in the absence of any change in a location of the selected tape spool pair in the receiving area.

2. An apparatus as recited in claim 1, wherein the engagement mechanism is configured to move the magnetic recording tape away from the spools of the selected tape spool pair and toward the magnetic head.

3. An apparatus as recited in claim 1, wherein the engagement mechanism is configured to move the magnetic head toward the magnetic recording tape.

4. An apparatus as recited in claim 1, comprising a drive mechanism configured to selectively drive the tape spool pairs, wherein the drive mechanism is configured to drive no more than three tape spool pairs at a time.

5. An apparatus as recited in claim 4, wherein the drive mechanism is configured to drive no more than one tape spool pair at a time.

6. An apparatus as recited in claim 4, wherein the drive mechanism includes an axle extending through a spool of each pair of tape spool pairs and a clutch for engaging the axle to a selected one of the spools.

7. An apparatus as recited in claim 1, wherein each mount includes a drive mechanism configured to selectively drive the tape spool pairs.

8. An apparatus as recited in claim 1, wherein each mount includes an engagement mechanism configured to create a relative movement between the magnetic head and the magnetic recording tape of the selected tape spool pair for engaging the magnetic recording tape with the magnetic head, wherein the engagement mechanism is configured to move the magnetic recording tape toward the magnetic head.

9. An apparatus as recited in claim 1, wherein each mount has at least one tape spool pair permanently mounted thereon.

10. An apparatus as recited in claim 1, wherein each mount is configured for selective attachment of the at least one tape spool pair thereto and selective detachment of the at least one tape spool pair therefrom.

11. An apparatus as recited in claim 1, wherein the positioning mechanism includes a guide along which the magnetic head is positionable, and a worm screw configured to move the magnetic head along the guide.

12. An apparatus as recited in claim 1, wherein each mount includes a drive mechanism configured to selectively drive the at least one tape spool pair.

13. An apparatus as recited in claim 1, wherein each mount includes the engagement mechanism.

14. An apparatus as recited in claim 1, wherein each mount includes the magnetic head.

15. An apparatus as recited in claim 1, wherein the receiving area is defined by the interior of a housing of the apparatus, the housing enclosing the mounts on at least five sides of the mounts; and comprising a coupling mechanism for coupling the mount to the interior of the housing.

16. An apparatus as recited in claim 1, wherein each mount has only a single panel extending along the plane that extends along radii of the tape spools, the tape spools being mounted on the single panel.

17. A method, comprising:

instructing a positioning mechanism to selectively align a magnetic head to a selected tape spool pair of a plurality of tape spool pairs in a receiving area of an apparatus, each tape spool pair being on a removable mount that is selectively insertable in its entirety in the receiving area of the apparatus having the positioning mechanism, the receiving area being defined by the interior of a housing of the apparatus;

instructing an engagement mechanism also located in the interior of the housing of the apparatus to create a relative movement between the magnetic head and a magnetic recording tape of the selected tape spool pair for engaging the magnetic recording tape with the magnetic head, the relative movement causing the engagement of the magnetic recording tape with the magnetic head without a change in a location of the selected tape spool pair in the receiving area;

instructing a drive mechanism to drive the selected tape spool pair; and causing the magnetic head to perform data operations on the magnetic recording tape of the selected tape spool pair.

18. A method as recited in claim 17, comprising causing a clutch to engage the drive mechanism with a spool of the selected tape spool pair.

19. A method as recited in claim 17, wherein the drive mechanism includes a plurality of motors positioned on the mounts, wherein instructing the drive mechanism to drive the selected tape spool pair includes instructing a pair of drive motors on the mount having the selected tape spool pair to drive the selected tape spool pair.

20. A method as recited in claim 17, wherein the drive mechanism includes an axle extending through a spool of each pair of tape spool pairs and a clutch for engaging the axle to a selected one of the spools.

21. A method as recited in claim 17, wherein the engagement mechanism is configured to move the magnetic head toward the magnetic recording tape.

22. A method as recited in claim 17, wherein the engagement mechanism is configured to move the magnetic recording tape toward the magnetic head.

23. A method as recited in claim 22, wherein the engagement mechanism is positioned on the mount having the selected tape spool pair.

24. A method as recited in claim 17, wherein at least three of the mounts are aligned in the receiving area such that an inner mount is sandwiched between outer mounts, the inner mount having a notch therein for allowing the magnetic head to pass therethrough from one of the outer mounts toward the other outer mount in a direction parallel to rotational axes of the tape spools.

25. A computer program product for performing data operations on magnetic recording tape, the computer program product comprising a computer readable storage medium having program instructions embodied therewith, the program instructions executable by an apparatus to cause the apparatus to:

instruct, by the apparatus, a positioning mechanism to selectively align a magnetic head to a selected tape spool pair of a plurality of tape spool pairs supported on removable mounts in a receiving area of the apparatus;

instruct, by the apparatus, an engagement mechanism to create a relative movement between the magnetic head and a magnetic recording tape of the selected tape spool pair without changing a location of the selected tape spool pair in the receiving area for engaging the magnetic recording tape with the magnetic head, the engagement mechanism solely creating the engagement of the magnetic recording tape with the magnetic head;

instruct, by the apparatus, a drive mechanism to drive the selected tape spool pair; and causing, by the apparatus, the magnetic head to perform data writing operations on the magnetic recording tape of the selected tape spool pair for writing data on the magnetic recording tape of the selected tape spool pair; and causing, by the apparatus, the written data to be mirrored to another tape spool pair.

\* \* \* \* \*